US010599672B2

(12) United States Patent
Lo et al.

(10) Patent No.: US 10,599,672 B2
(45) Date of Patent: Mar. 24, 2020

(54) CURSOR-BASED STATE-COLLAPSE SCHEME FOR SHARED DATABASES

(71) Applicant: Cisco Technology, Inc., San Jose, CA (US)

(72) Inventors: Jeffrey Y. D. Lo, Cupertino, CA (US); Pratap Pereira, Saratoga, CA (US); Rajeev Kochhar, Saratoga, CA (US); Vinit Rajan Kizhakkel, San Jose, CA (US); Clinton Grant, Artarmon (AU)

(73) Assignee: Cisco Technology, Inc., San Jose, CA (US)

( * ) Notice: Subject to any disclaimer, the term of this patent is extended or adjusted under 35 U.S.C. 154(b) by 511 days.

(21) Appl. No.: 15/288,140

(22) Filed: Oct. 7, 2016

(65) Prior Publication Data

US 2017/0147669 A1 May 25, 2017

Related U.S. Application Data

(60) Provisional application No. 62/259,627, filed on Nov. 24, 2015, provisional application No. 62/259,527, filed on Nov. 24, 2015.

(51) Int. Cl.
G06F 17/30 (2006.01)
G06F 16/27 (2019.01)
(Continued)

(52) U.S. Cl.
CPC .......... *G06F 16/27* (2019.01); *G06F 16/2282* (2019.01); *G06F 16/23* (2019.01)

(58) Field of Classification Search
CPC ......... G06F 17/30375; G06F 17/30339; G06F 17/30345; G06F 16/27; G06F 16/2282; G06F 16/23
See application file for complete search history.

(56) References Cited

U.S. PATENT DOCUMENTS 5,471,629 A    11/1995 Risch
5,826,253 A *  10/1998 Bredenberg ........ G06F 12/0815
(Continued)

OTHER PUBLICATIONS

"Replication (computing)", https://en.wikipedia.org/wiki/Replication_%28computing%29, Jan. 13, 2016, 8 pages, Wikimedia Foundation, Inc.
(Continued)

*Primary Examiner* — Jeff A Burke
*Assistant Examiner* — Fernando M. Mari
(74) *Attorney, Agent, or Firm* — Behmke Innovation Group LLC; James Behmke; Stephen D. LeBarron

(57) ABSTRACT

In one embodiment, a cursor management process inserts temporal references into a plurality of records written to a table of a shared database, the temporal references indicative of an order in which the records are written. A table write cursor points at a last-written record from among the plurality of records, and read cursors point to a last-read record of a corresponding application. The cursor management process may then provide, table updates to a particular application by determining a chain of one or more updated records of the table from the last-read record of the particular application to the last-written record based on walking a particular read cursor for the particular application through the temporal references of the one or more updated records until the particular read cursor points to the last-written record according to the table write cursor.

18 Claims, 23 Drawing Sheets

(51) Int. Cl.
*G06F 16/23* (2019.01)
*G06F 16/22* (2019.01)

(56) References Cited

U.S. PATENT DOCUMENTS

| | | | |
|---|---|---|---|
| 6,442,543 | B1 | 8/2002 | Snodgrass et al. |
| 6,721,740 | B1 | 4/2004 | Skinner et al. |
| 6,826,560 | B1 | 11/2004 | Leymann et al. |
| 6,976,022 | B2 | 12/2005 | Vemuri et al. |
| 8,510,336 | B2 | 8/2013 | Verma et al. |
| 8,719,217 | B1* | 5/2014 | Vivalda ............... G06F 16/283 707/608 |
| 8,769,350 | B1* | 7/2014 | Ro ....................... G06F 17/30607 707/823 |
| 9,128,932 | B2* | 9/2015 | Belanger ............ G06F 16/2365 |
| 2002/0188871 | A1* | 12/2002 | Noehring ............... H04L 29/06 726/13 |
| 2004/0260674 | A1* | 12/2004 | Primm ............... G06F 11/3058 |
| 2005/0192989 | A1* | 9/2005 | Adiba ................. G06F 16/2365 |
| 2008/0235355 | A1* | 9/2008 | Spanier ................. G01D 4/004 709/219 |
| 2012/0023077 | A1* | 1/2012 | Kann ..................... G06F 16/275 707/702 |
| 2012/0311290 | A1* | 12/2012 | White ................. G05B 23/0264 711/170 |
| 2014/0039558 | A1* | 2/2014 | Alannin ............. A61B 17/7062 606/279 |
| 2014/0101761 | A1* | 4/2014 | Harlacher ........... H04L 63/1425 726/23 |
| 2015/0039558 | A1* | 2/2015 | Yamada ............. G06F 16/2329 707/623 |
| 2015/0039573 | A1* | 2/2015 | Bhattacharjee ..... G06F 16/2329 707/693 |
| 2015/0127690 | A1* | 5/2015 | Hazlewood ........... G06F 16/254 707/809 |

OTHER PUBLICATIONS

Vargas, et al., "Integrating Databases with Publish/Subscribe", 25th IEEE International Conference on Distributed Computing Systems Workshops, Jun. 2005, 6 pages, IEEE.

\* cited by examiner

CURSOR-BASED STATE-COLLAPSE SCHEME FOR SHARED DATABASES

RELATED APPLICATION

This application claims priority to U.S. Provisional Application No. 62/259,627, filed on Nov. 24, 2015, entitled CURSOR-BASED STATE-COLLAPSE SCHEME FOR UPDATE TRACKING, READER NOTIFICATION, AND NETWORK-WIDE REPLICATION FOR IN-MEMORY TRANSACTIONAL DATABASES, by Jeffrey Y. Lo, et al., and U.S. Provisional Application No. 62/259,527, filed on Nov. 24, 2015, entitled CONTROLLING DATABASE CHANGE NOTIFICATIONS, by Clinton Grant, et al., the contents of each of which are herein incorporated by reference.

TECHNICAL FIELD

The present disclosure relates generally to computer network operating systems, and, more particularly, to a cursor-based state-collapse scheme for shared databases (e.g., for update tracking, reader notification, and network-wide replication for in-memory transactional databases).

BACKGROUND

An operating system (OS) is system software that manages computer hardware and software resources, and provides common services for computer programs. General operating systems perform basic tasks, such as recognizing input from the keyboard, sending output to the display screen, keeping track of files and directories on the disk, and controlling peripheral devices such as disk drives and printers.

A computer network operating system, specifically, is a specialized operating system for a network device such as a router, switch, firewall, and so on. For instance, the Internetwork Operating System (IOS) available from Cisco Systems, Inc. is an example computer network operating system, where the IOS software used on routers and switches provides a package of routing, switching, internetworking, and telecommunications functions integrated into a multitasking operating system. For example, a computer network operating system can provide IP routing (basic, IPv4, IPv6, etc.) for data, voice, video, etc., and can provide security services and virtual private network (VPN) services as well as a myriad of other features, such as tunneling protocols, path reservation protocols, connectivity verification protocols, and so on. Generally, computer network operating systems function on various classes of network platforms. Such platforms include routers, switches (e.g., ATM switches, LAN and WAN switches, etc.), file servers, intelligent hubs, personal computers, and any other devices that function within an internetwork.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
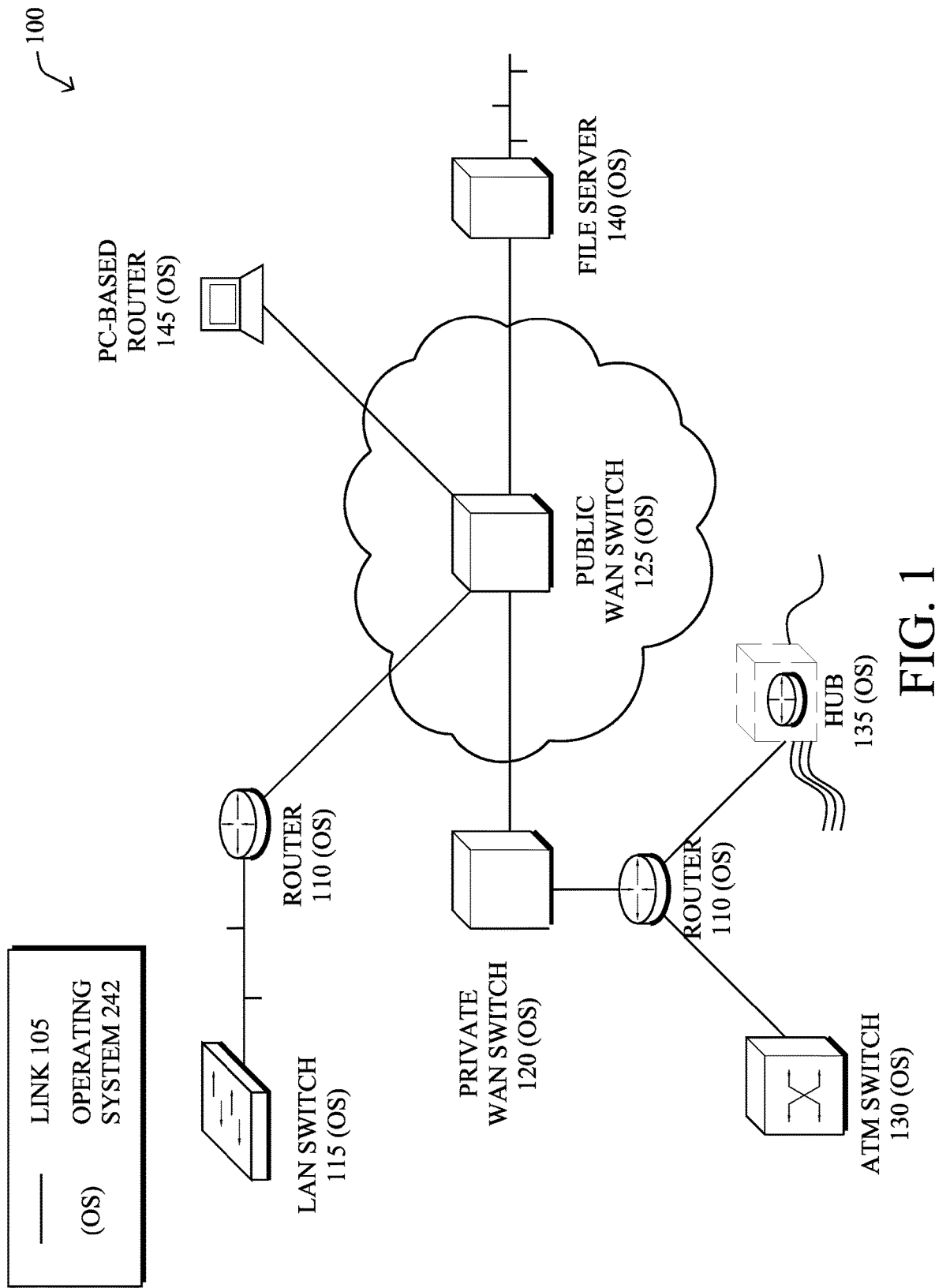
FIG. 1 illustrates an example communication network.

According to one or more embodiments of the disclosure, a cursor management process inserts temporal references into a plurality of records written to a table of a shared database, the temporal references indicative of an order in which the records are written. The cursor management process also points a table write cursor at a last-written record from among the plurality of records, and maintains one or more read cursors for the table, each read cursor pointing to a last-read record of a corresponding application from among the plurality of records. The cursor management process may then provide table updates to a particular application by determining a chain of one or more updated records of the table from the last-read record of the particular application to the last-written record based on walking a particular read cursor for the particular application through the temporal references of the one or more updated records until the particular read cursor points to the last-written record according to the table write cursor.

According to one or more additional embodiments of the disclosure, an application may subscribe to updates of a table of a shared database, where the table has a plurality of records with temporal references written into the records as mentioned above. In response to receiving a notification of an update to the table, the application may consume table updates from the database according to a chain of one or more updated records of the table from the last-read record of the application to the last-written record based on walking the read cursor for the application through the temporal references of the one or more updated records until the read cursor points to the last-written record according to the table write cursor.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

FIG. 1 is a schematic block diagram of an example computer network 100 illustratively comprising nodes/devices, such as a plurality of routers, switches, and so on interconnected by links 105 or networks, as shown. For instance, such devices may illustratively comprise routers 110, LAN switches 115, private WAN switches 120, public WAN switches 125, ATM switches 130, hubs 135, file servers 140, PC-based routers 145, etc. Notably, each device may have an operating system (OS) 242, as described below.

Data packets (e.g., traffic/messages) may be exchanged among the nodes/devices of the computer network over links 105 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. The links themselves may be wired links, wireless links, powerline communication links, and so on. Those skilled in the art will understand that any number of nodes, devices, links, etc. may be used in a computer network, and that the view shown herein is for simplicity.

Figure 2:
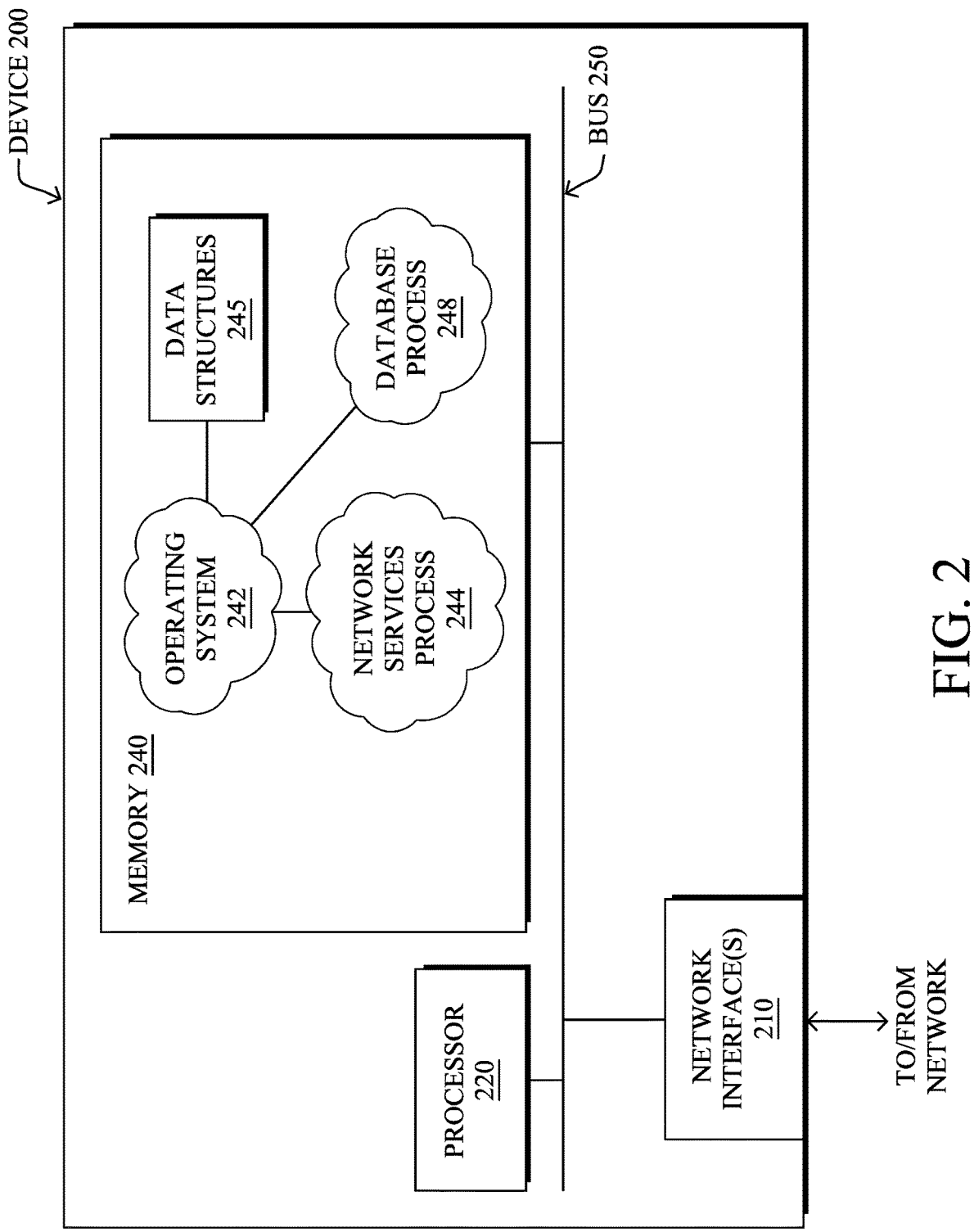
FIG. 2 illustrates an example computing device.

FIG. 2 is a schematic block diagram of an example node/device 200 that may be used with one or more embodiments described herein, e.g., as any of the devices of network 100, or any other computing device that may perform the operating system techniques described herein (e.g., routers, switches, etc.). Device 200 comprises a one or more network interfaces 210, one or more processors 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols. Note that the nodes may have multiple types of network connections 210, e.g., wireless and wired/physical connections, and that the view herein is merely for illustration.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the device by, among other things, invoking operations in support of software processes and/or services executing on the device. These software processes and/or services may include one or more network service processes 244, such as routing processes, switching processes, traffic engineering processes, security processes, and so on, any of which optionally being alternatively be located within individual network interfaces. An illustrative "database" process 248 may also be present on the device 200, the functionality of which being detailed further below (e.g., "cursor management process" or "cursor layer" 248, as described below).

Note that while dynamic processes are shown in centralized memory 240, alternative embodiments provide for the process to be specifically operated within the operating system 242, or within network interfaces 210. It will also be apparent to those skilled in the art that other processor and memory types, including various computer-readable media, may be used to store and execute program instructions pertaining to the techniques described herein. Further, while the description illustrates various processes, it is expressly contemplated that various processes may be embodied as modules configured to operate in accordance with the techniques herein (e.g., according to the functionality of a similar process). Moreover, while the processes have been shown separately, those skilled in the art will appreciate that processes may be routines or modules within other processes.

As an illustrative example of a network service process 244, a routing process may include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Other types of functional processes may be used by the device 200, and a routing process is merely one example that is not meant to be limiting to the embodiments herein.

A database provides a structured way of storing information. In a graph database, for example, the states are represented in atomic units known as nodes and the nodes are organized in the form of a graph. This is to say, there can be a direct reference from a node to another node. Sometimes a node can reference a 'container' which contains many other nodes. Examples of a container are an array, a link-list or even a key lookup structure (AVL, RB, hash tree) etc.

Figure 3:
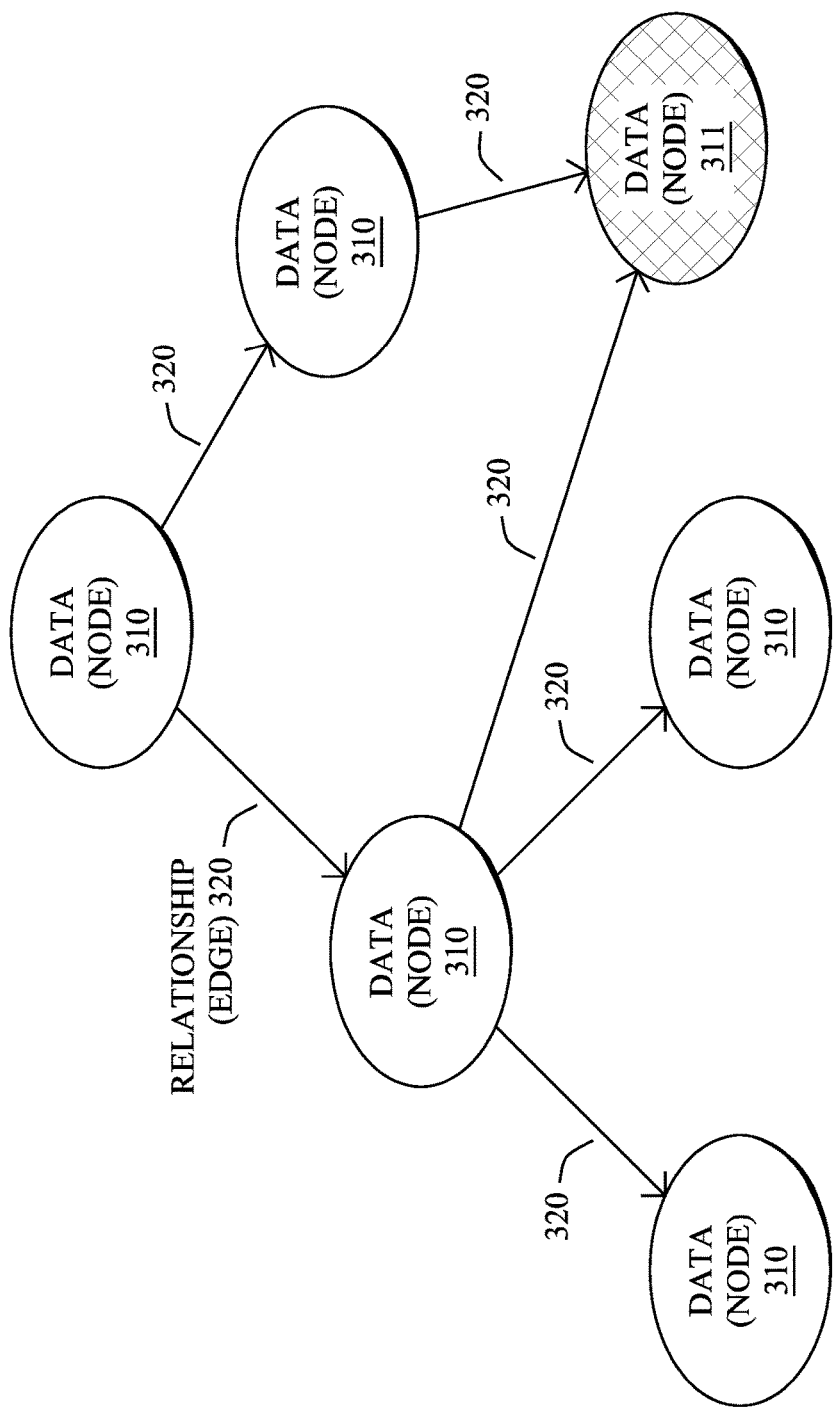
FIG. 3 illustrates an example graph database.

Said differently, a graph database stores data in the form of "nodes" that are interconnected via "edges" that define the relationship between them. Nodes contain information about different objects stored in the database and the edges can be used to travel from one node to another based on certain criteria. FIG. 3 illustrates an example graph database 300, where data (nodes) 310 are interconnected via relationships (edges) 320. In a distributed graph database, the data 310 may be maintained locally on the device executing an application, or else on a different (e.g., remote) device, such as, for example, data node 311, which may be a reference to an object stored or maintained by a different application or device.

The use of graph databases in the context of a computer networking system, for example, involves the storage of configuration and operational states on the system. The networking system (NS) here can either refer to physical device that performs the control and/or dataplane forwarding function or virtualized system that runs in a cloud environment. The graph databases in the NS need to be accessed in a programmatic manner. For instance, one path of such accesses is from various northbound manageability agents (CLI, SNMP, WEBUI, etc.). Therefore it typically make sense to split the DB access framework into a front-end and a back-end portion, where the front-end is collocated with the entity performing the query and the back-end collocated with the actual datastore and serves the query.

Figure 4:
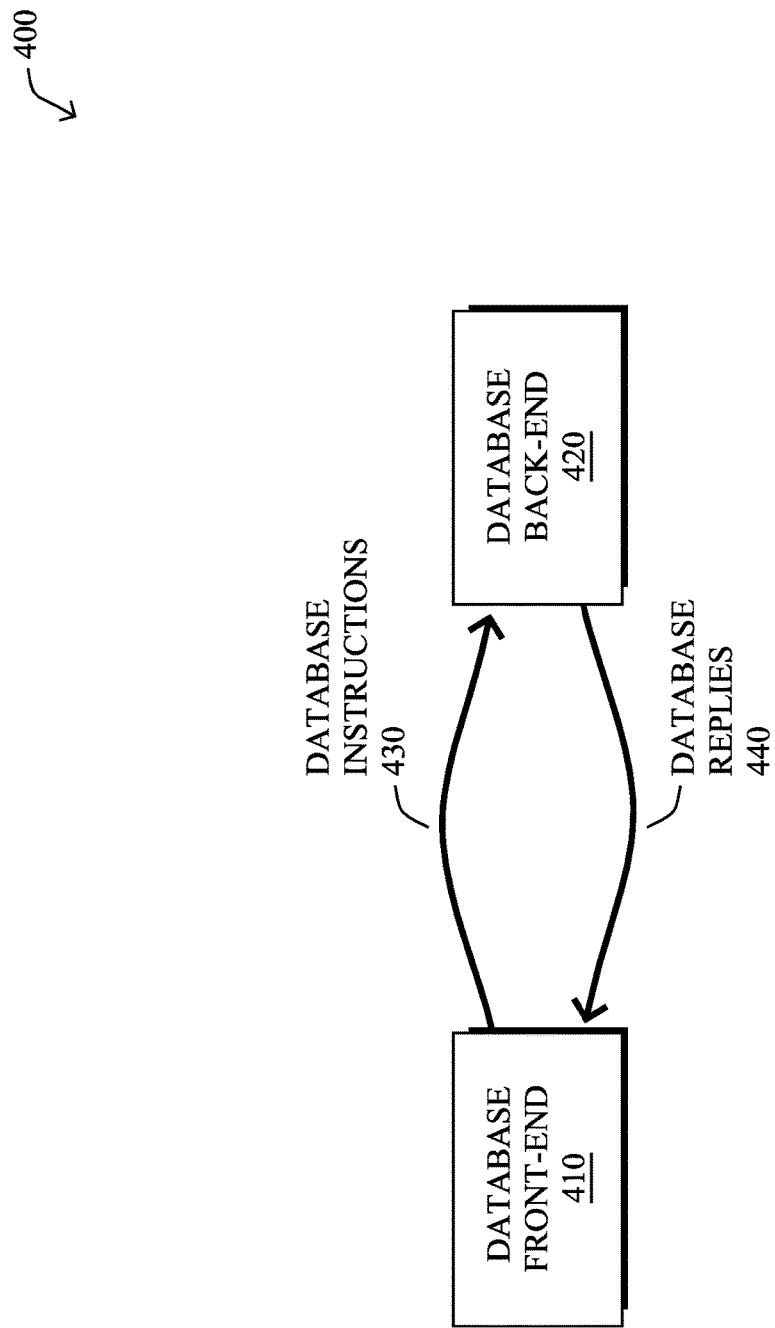
FIG. 4 illustrates an example of a database front-end and back-end.

FIG. 4 illustrates a simplified example of a high-level database architecture 400 with a front-end 410 and back-end 420. The database front-end 410 offers a user programming interface to translate input parameters to database instructions 430, which in turn exercise the database back-end 420 (e.g., an execution engine with the capability to interpret database instructions). Database replies 440 (e.g., data for queries, acknowledgment for actions taken, etc.) may then be returned based on the database access.

Notably, the front-end access to the back-end can be local or remote. Remote access could mean from one process to another process running on the same FRU (field replaceable unit), from one process to another process on different FRUs, or across different boxes. Remote access could also mean from one virtualized system to another virtualized systems, or from a virtualized 'brain' to a physical device.

Figure 5:
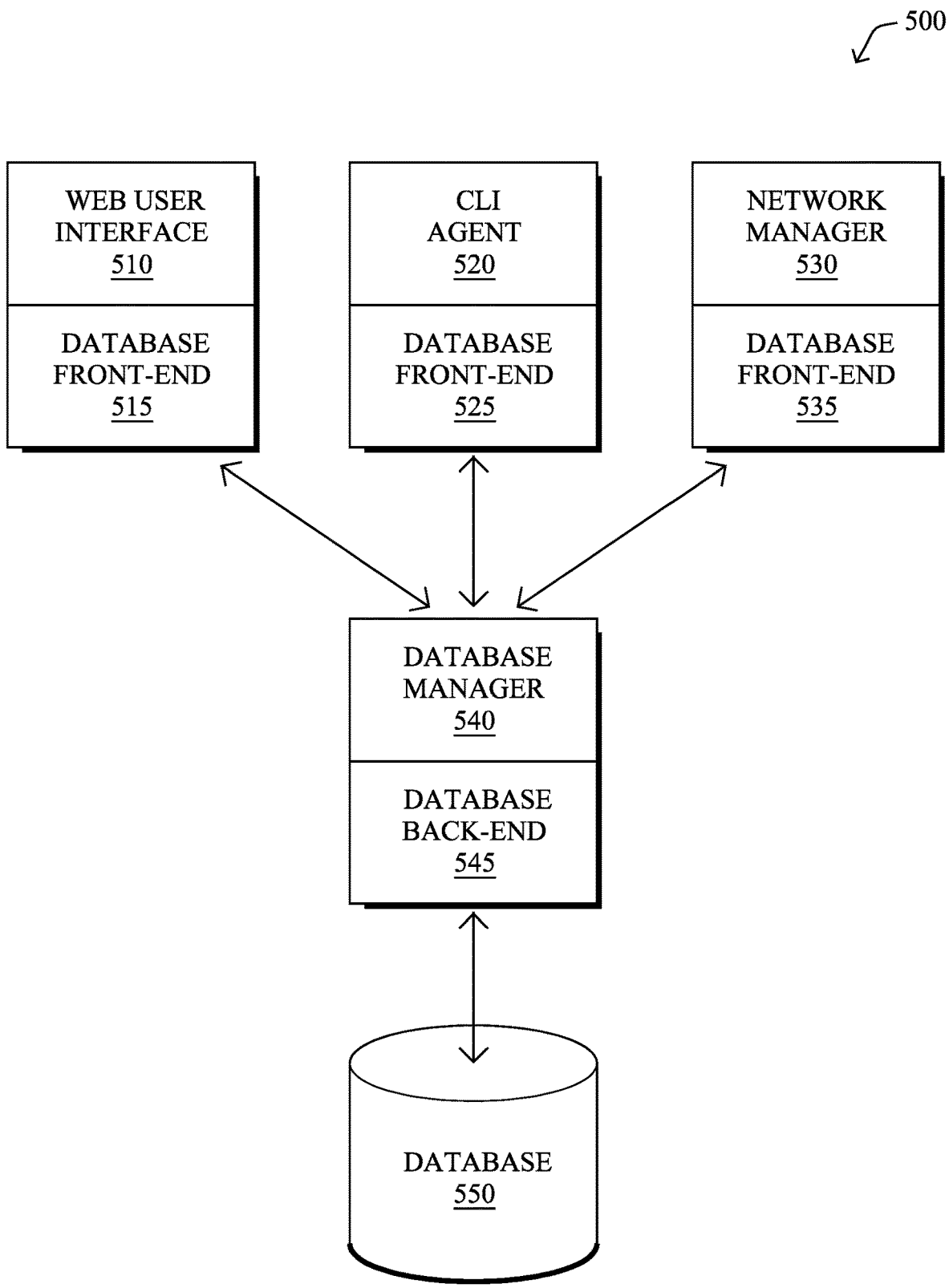
FIG. 5 illustrates an example database logical architecture.

FIG. 5 illustrates a high-level representation of an example database logical architecture 500. The database front-ends 515, 525, and 535 (collectively 410 above) are illustratively run as libraries within a web user interface (e.g., WebUI) agent 510, a CLI-agent process 520, as well as a network manager process (e.g., distributed networking operating system) 530, respectively. The database back-end 545 (420 above) illustratively runs as a library within the database manager (DBM) process 540 interacting with the database 550.

Notably, the use of a graph database herein is merely an example, and other suitable types of databases may be used in accordance with the techniques described herein.

———Cursor-Based State-Collapse Scheme———

In high performance computing systems such as enterprise routers and switches, multiple processes store critical operational and configuration data in external databases. For example, such processes may include a forwarding manager, a wireless controller module (WCM), session manager daemon (SMD) for various operating systems.

In such systems with multiple processes concurrently accessing shared databases, an efficient software infrastructure is needed to:

1. Notify interested processes regarding records being created, updated or deleted while being extremely efficient in memory usage;
2. Synchronize databases to their peer redundant ones for reliability and high availability while enabling efficient bandwidth utilization; and
3. Keep track of objects that are no longer needed in the database and delete them using a periodically scheduled garbage collection run only after all the readers interested in those objects did indeed receive the corresponding delete notifications.

The techniques herein, therefore, provide a unique software infrastructure layer that:

1. Provides a state-collapsed approach to reflect the latest updates on a database, thus efficiently managing memory, eliminating state build up and boosting the overall performance of the system;
2. Simultaneously provides a one-stop solution for multiple readers to get push notifications from the database and read them concurrently, thus also paving the way for data replication with no special case logic for it;
3. Has provisions for interested readers to get callbacks for each field that updated by the writer;
4. Enables simple and efficient restart and recovery models for various daemons accessing the shared databases; and
5. Provides a single uniform interface that can be used for different manageability agents like CLI, WebUI as well as an external northbound controller.

Specifically, according to one or more techniques described herein, a cursor management process inserts temporal references into a plurality of records written to a table of a shared database, the temporal references indicative of an order in which the records are written. The cursor management process also points a table write cursor at a last-written record from among the plurality of records, and maintains one or more read cursors for the table, each read cursor pointing to a last-read record of a corresponding application from among the plurality of records. The cursor management process may then provide table updates to a particular application by determining a chain of one or more updated records of the table from the last-read record of the particular application to the last-written record based on walking a particular read cursor for the particular application through the temporal references of the one or more updated records until the particular read cursor points to the last-written record according to the table write cursor.

Said differently, an application may write a plurality of records to a table of a shared database, where the writing comprises inserting temporal references into the records indicative of an order in which the records are written. The application modifying a table's record also makes the table write cursor point at the last-written record from among the plurality of records. Any applications interested in receiving notifications regarding updates on the table maintain one or more read cursors on it, each read cursor pointing to a last-read record corresponding to the application from among the plurality of records. This cursor-based layer provides a notification to an application's read cursor whenever the table's records are inserted, modified or deleted. The cursor layer may then provide, in response to a read request from a particular (reader) application in response to such notifications, table updates to the particular application by determining a chain of one or more updated records of the table from the last-read record of the particular application to the last-written record based on walking a particular read cursor for the particular application through the temporal references of the one or more updated records until the particular read cursor points to the last-written record according to the table write cursor. Notably, there also exists a database dependency manager (DBDM) library residing above the cursor layer, which presents updated records in different tables in the dependency order or sequence desired by the application.

Illustratively, the techniques described herein may be performed by hardware, software, and/or firmware, such as by the database process 248 (e.g., as a cursor management process (cursor layer) and/or an application interfacing with a database, such as a replication manager) within and/or through coordination with the operating system 242, which may contain computer executable instructions executed by the processor 220 to perform functions relating to the techniques described herein. Note that while reference is made to functionality within the operating system 242, portions of the techniques described herein may be performed by any combination of various processes, and it is also expressly contemplated that various processes may be embodied as modules configured to operate in accordance with the techniques herein (e.g., according to the functionality of a similar process).

Operationally, an illustrative and example network operating system herein uses in-memory shared databases to store configuration and operational data needed by different services that run on the routing and switching platforms that it supports. Illustratively, these databases may have a schema layer provided by an illustrative interface definition language (DL). Notably, the database engine may illustratively work with an in-place modify locking model with an undo-log implementation. The in-place modify provides the speed needed to almost match the performance characteristic of the underlying non-transactional data structure. (These transactions are the foundational element that provides safety in the restart case to know that if the last inflight operation is un-done via the undo log, there is no opportunity for the data structures to be corrupt or in a partially updated state. The undo-log is a structural log that logs memory allocations/frees and all memory writes, i.e., it is not an operational log.)

The techniques herein define a temporal list and cursor based scheme that may be used to create a very high-performance distributed database system that provides for the following:

1. A state-collapse model that uses memory efficiently and prevents state build-up even at high scale;
2. Concurrent read or write operations to the databases from multiple contending processes;
3. Integrated database notification infrastructure for readers. This also serves as the foundation for the update processing infrastructure of the operating system WebUI;
4. Fully stateful restarts for all reader/writer processes; and
5. An efficient, high performance and completely replicable store for mission-critical data for High Availability (HA), distribution of configuration from a controller to the network devices it manages and the export of operational data from network devices to the controller.

Regarding state collapse, consider a database shared by different applications that can read and/or write to it using database transactions. When an application writes to the database, it can perform a combination of create, update or delete operations. This results in objects undergoing transitions from one "state" to another.

Figure 6A:
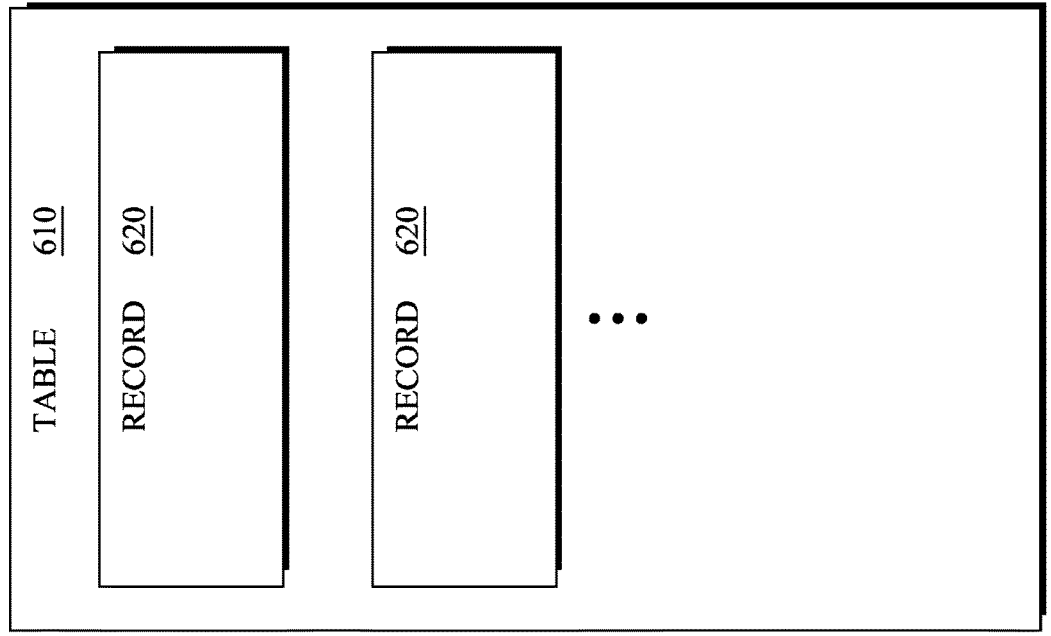
FIGS. 6A-6B illustrate an example of database tables, records, and record updating.
Figure 6A:
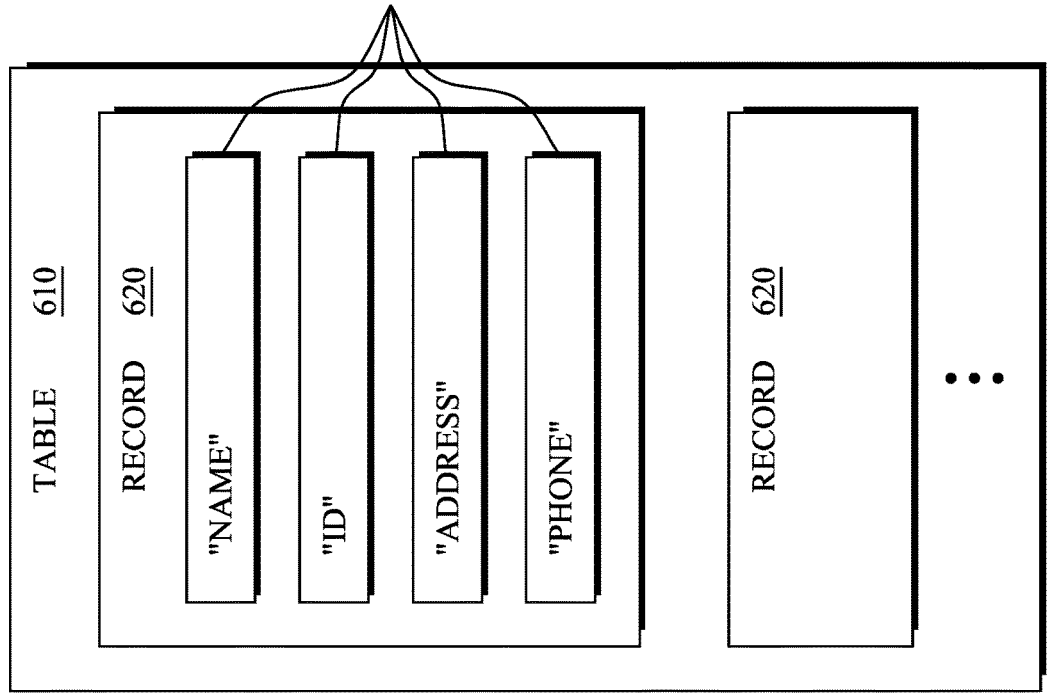
Figure 6B:
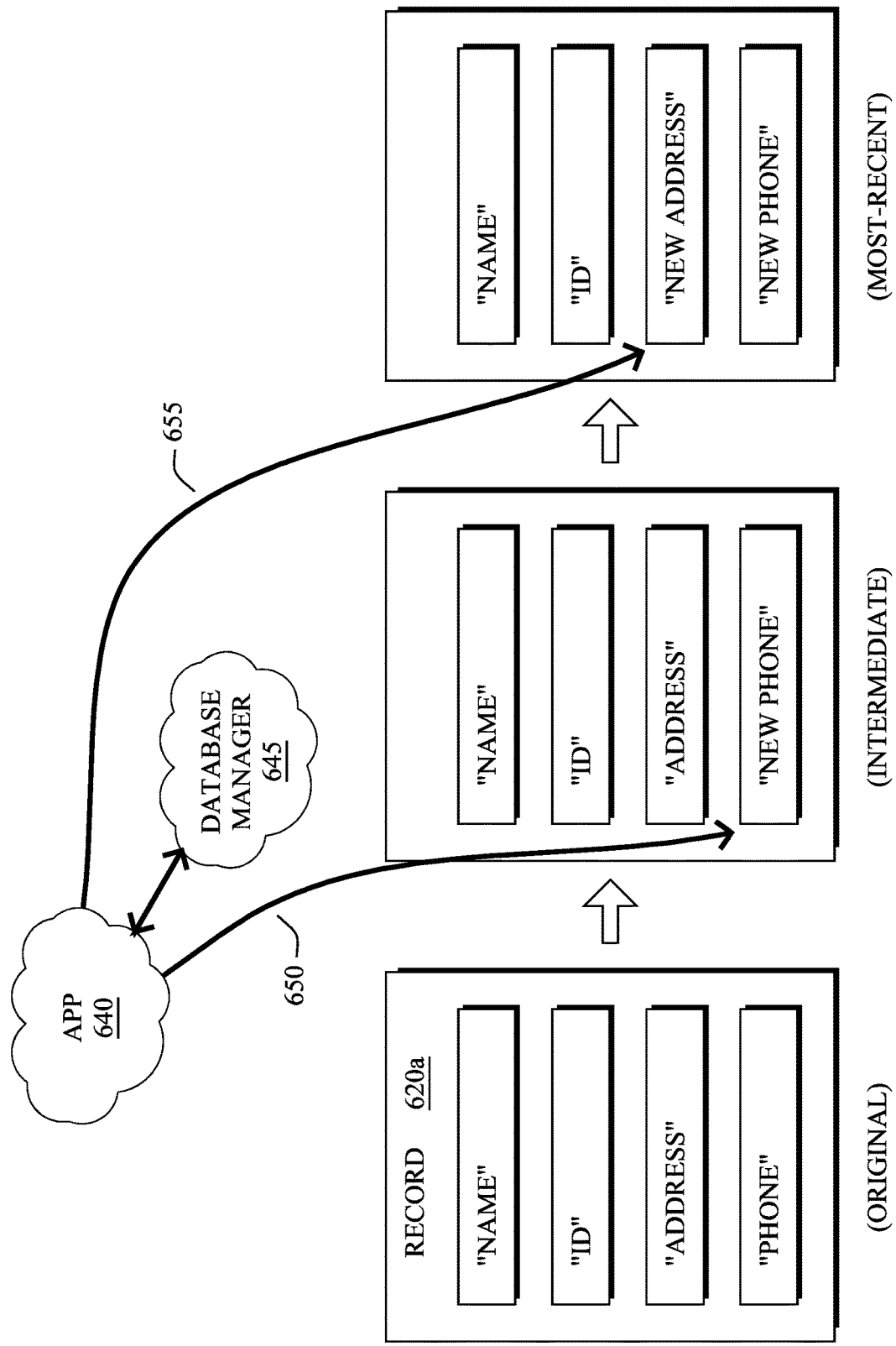

For example, with reference to FIG. 6A, consider an example database 600 containing customer data in one or more tables 610, wherein each record 620 of the table can be through of as a set of fields 630 containing customer data such as customer name, customer id, address and phone number. Now assume that as shown in FIG. 6B, an application 640 updates (via database manager 645) the phone number of a customer (record 620*a*) in one transaction (write 650) and the same customer's address in a subsequent one (write 655). From the point of view of the record 620*a*, it has gone through two separate changes. Any application interested in receiving updates from the database should be told about the new values in the updated record.

In most databases today, this sequence of updates to the same record is preserved and replayed to the "reader" applications in the order in which they took place. This is done by preserving a separate copy of the record for each update that took place after its last known update (e.g., a first intermediate copy of record 620*a* with the new phone number, and then a second most-recent copy with the new address) or by keeping track of each operation performed. While this technique helps in faithfully preserving the order of updates for the reading applications, it performs very poorly in terms of performance bottlenecks and memory usage when the database undergoes high volumes of updates from multiple applications. A steady influx of such updates over a period of time may very well cause the database to run out of memory, particularly for in-memory databases. Moreover, these situations become worse very quickly for implementations that maintain separate per-reader copies of the updates.

As opposed to this, in the state-collapsed model herein, there are no additional copies of the record and the record itself reflects its latest state with the most recent update. In other words, the record updates are "collapsed" into the same single physical copy of the record to which all interested readers refer. This is true for updates spanning across multiple transactions. From the point of view of the readers, they get notified and presented with the latest state of a record (i.e., depending on when it starts a read transaction on the database, a reader of the record could only see the most-recent record (new phone and new address), not the intermediate record (new phone only)). Apart from the huge memory savings, this model also eliminates the overhead of generating and processing multiple notifications for intermediate updates, thus improving overall performance even at high scale (high volumes of creates/updates/deletes). The foundation of this state-collapse model is a temporal list and cursor based scheme that is described in detail in subsequent sections.

1. Temporal List

According to one or more embodiments of the techniques herein, a temporal list can be created on into any table of the database that the reader or writer chooses. The temporal list exploits the definition of a record structure (e.g., in the DL) such that any record inserted into such a table is simultaneously threaded into a tree (or hash table) and a linked list. While the arrangement in the tree allows for efficient record updates and deletions, the linked list counterpart makes it possible to keep track of any updates to the records of that table in temporal order.

Figure 7:
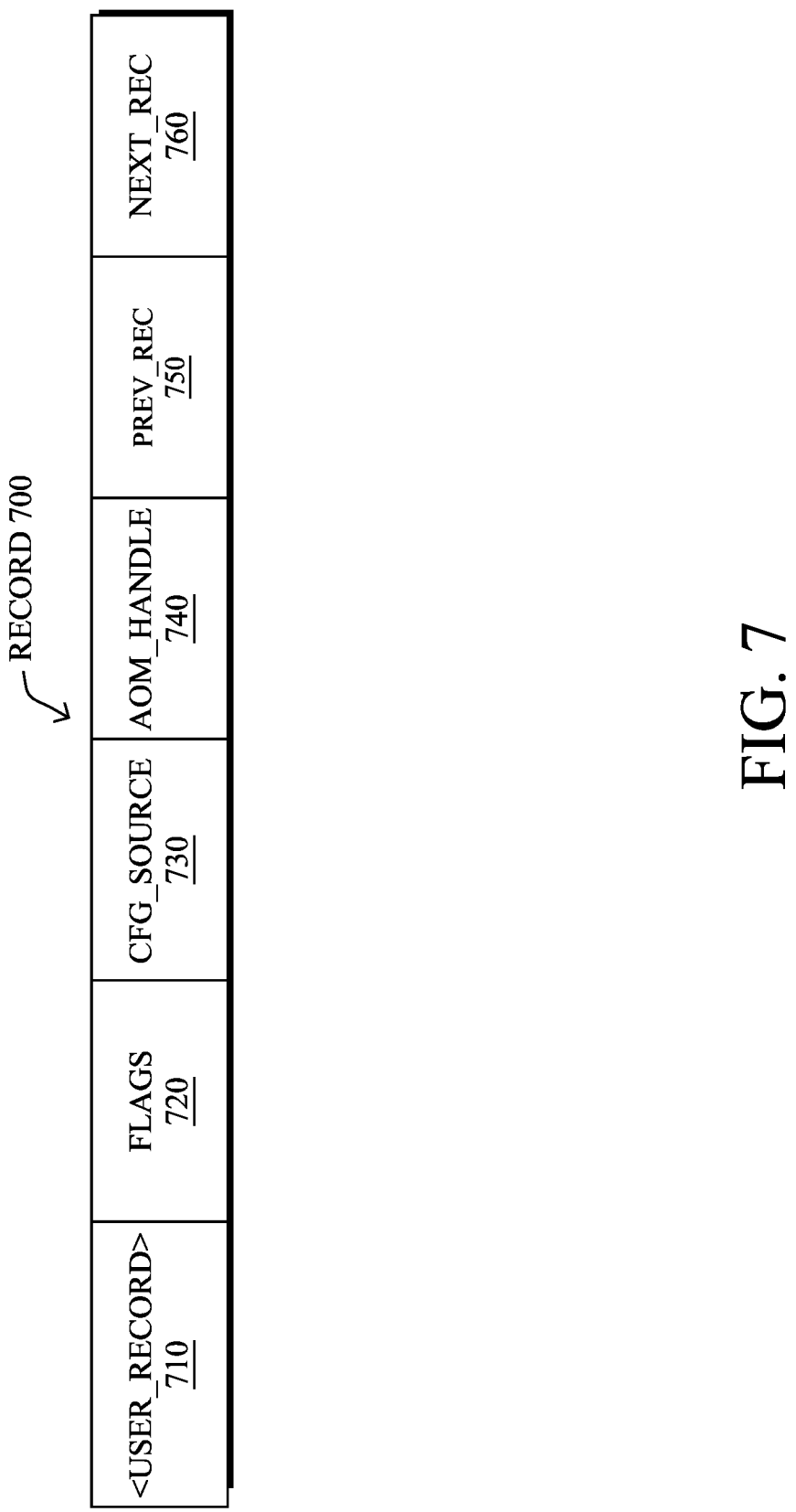
FIG. 7 illustrates an example database record format.

The record structure that enables its duality of being in a list and a tree simultaneously is described with reference to FIG. 7. In particular, the records 700 (e.g., records 620 above) in the table may illustratively be stored in temporal (time) order using the following top level format:

<user_record> 710: The user defined portion of the record (e.g., the name, ID, phone number, address, etc., fields/attributes from above);

flags 720: This field may be used to determine the operation that was performed on the record, e.g., a create, delete, or update (note that this field may be set to a pending delete on a call to delete the record, where the actual delete is performed later in the garbage collection phase, described below);

cfg_source 730: This field tracks the creator of the record (e.g., CLI, WebUI, Controller, etc.);

aom_handle 740: An optional field that is only valid if the record is being injected through the DBDM layer (i.e., an aom_handle returned by the Abstract Object Manager (AOM) layer is stored here);

prev_rec 750 and next_rec 760: The temporal list is maintained by chaining the records through list entries embedded within the records themselves (i.e., a previously written record 750 and a next-written record 760).

2. Cursors and Update Notifications

Cursors are structures that refer to a record in the database. There are two kinds of cursors—read and write. The cursor data structure contains a pointer to the record that is currently pointing to. The cursor's record pointer is updated using atomic operations.

Figure 8:
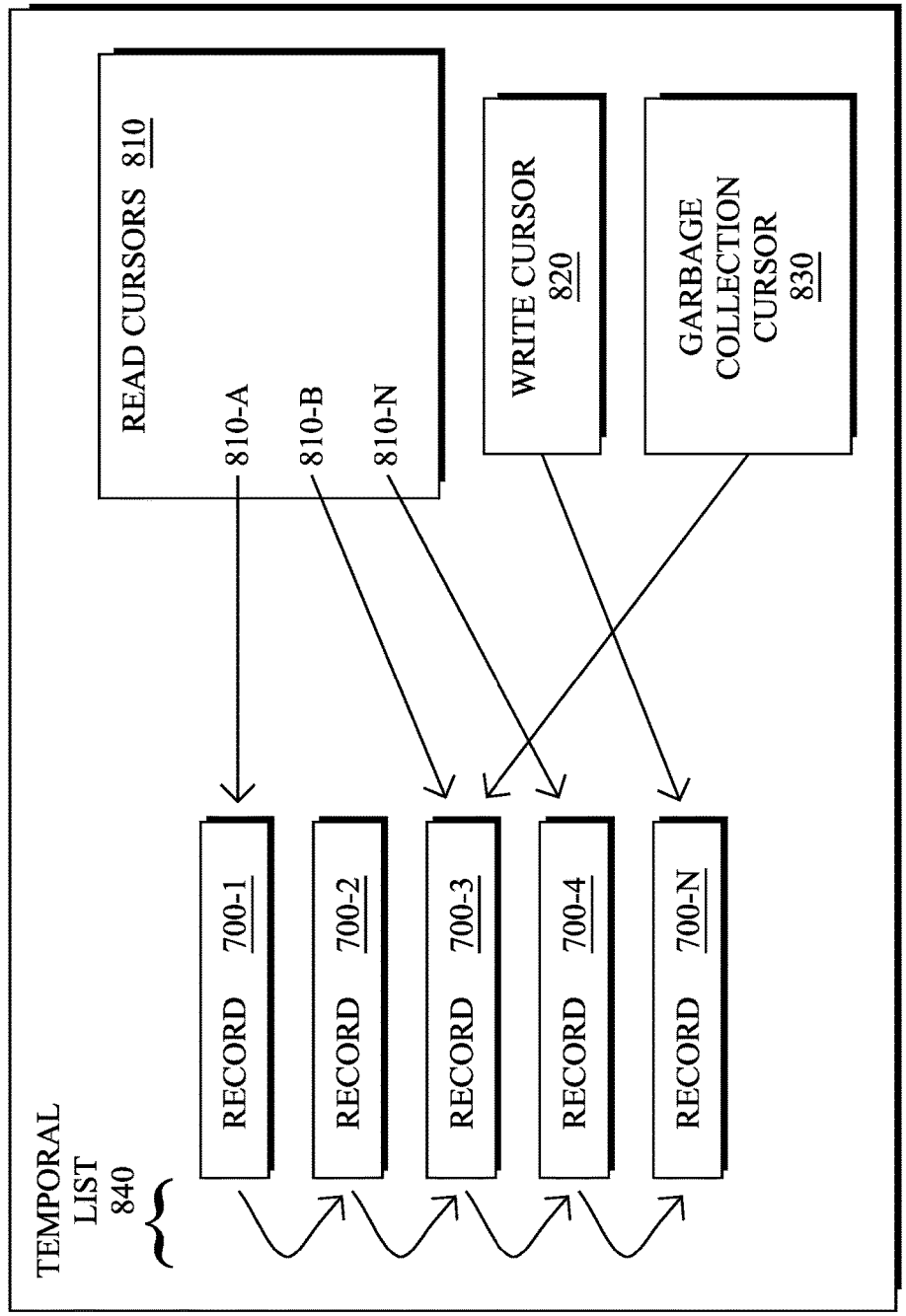
FIG. 8 illustrates an example of read and write cursors and a temporal list within a table of a database.

As shown in FIG. 8, each table root 800 stores a list of read cursors 810 (e.g., 810-A through 810-N), its write cursor 820, and the garbage collection cursor 830. The cursors store record pointers (identification of a particular record 700, e.g., 700-1 through 700-N). Since walking the table (described below) through the temporal list 840 (created through prev_rec 750 and next_rec 760 entries) causes an update of the read cursor, all update operations on the cursors will be done using atomic operations so no locks need to be taken for cursor manipulation.

2a. Write Cursor

The moment a process enables a temporal list 840 on any table in the database, a "write cursor" 820 is created on this list. The write cursor tracks every update made to any record in the table.

Figure 9A:
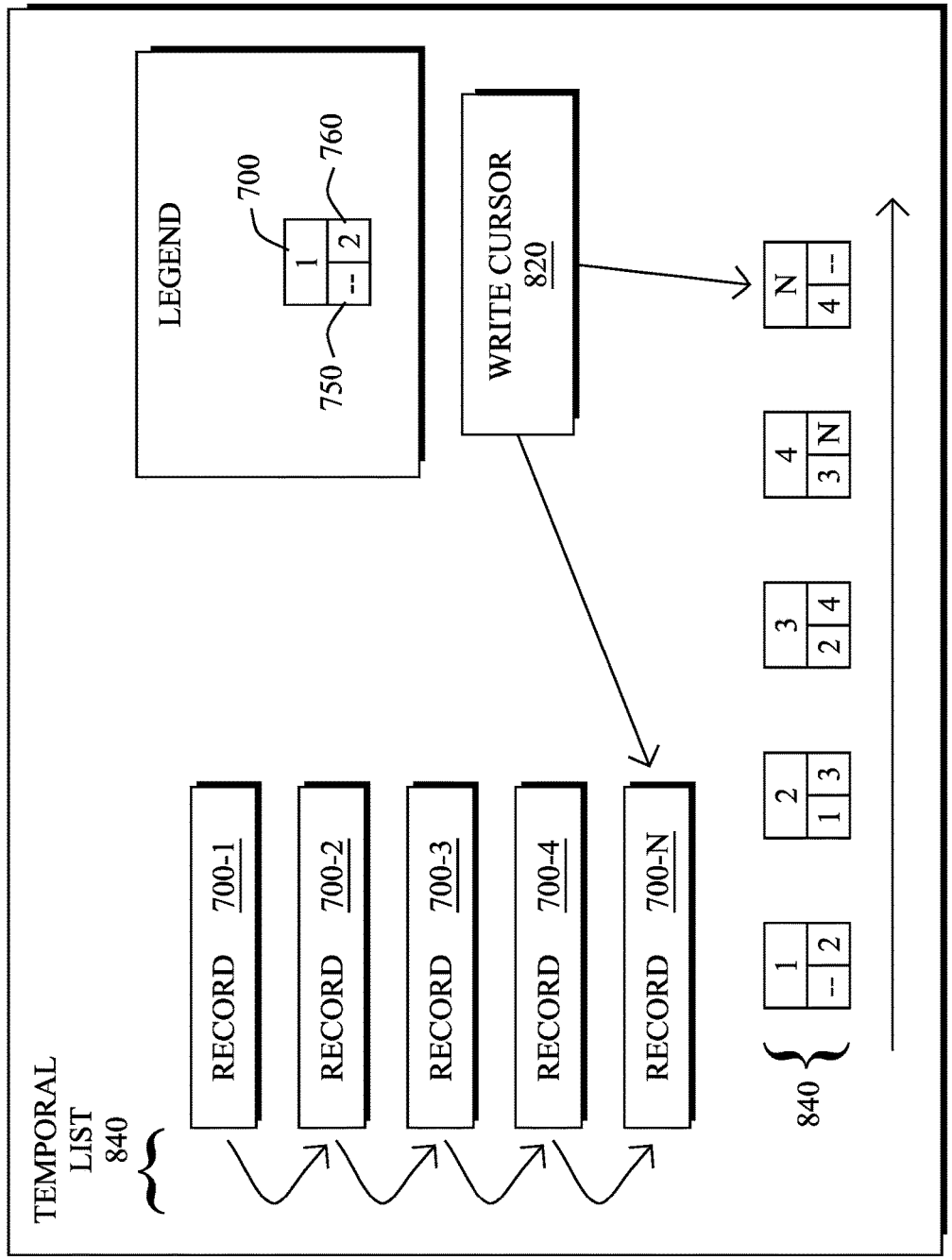
FIGS. 9A-9C illustrate an example of a temporal list and write cursor tracking.
Figure 9B:
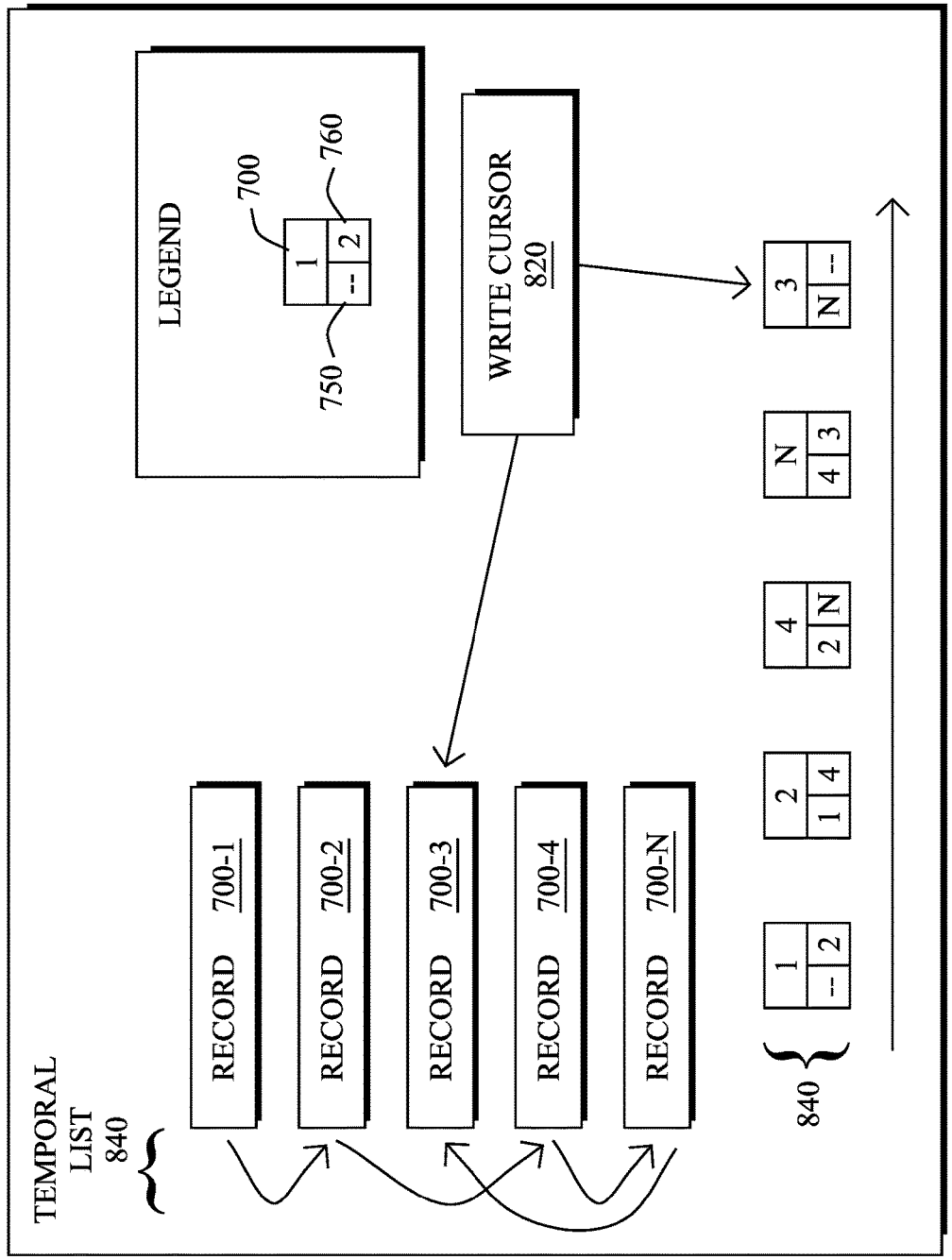
Figure 9C:
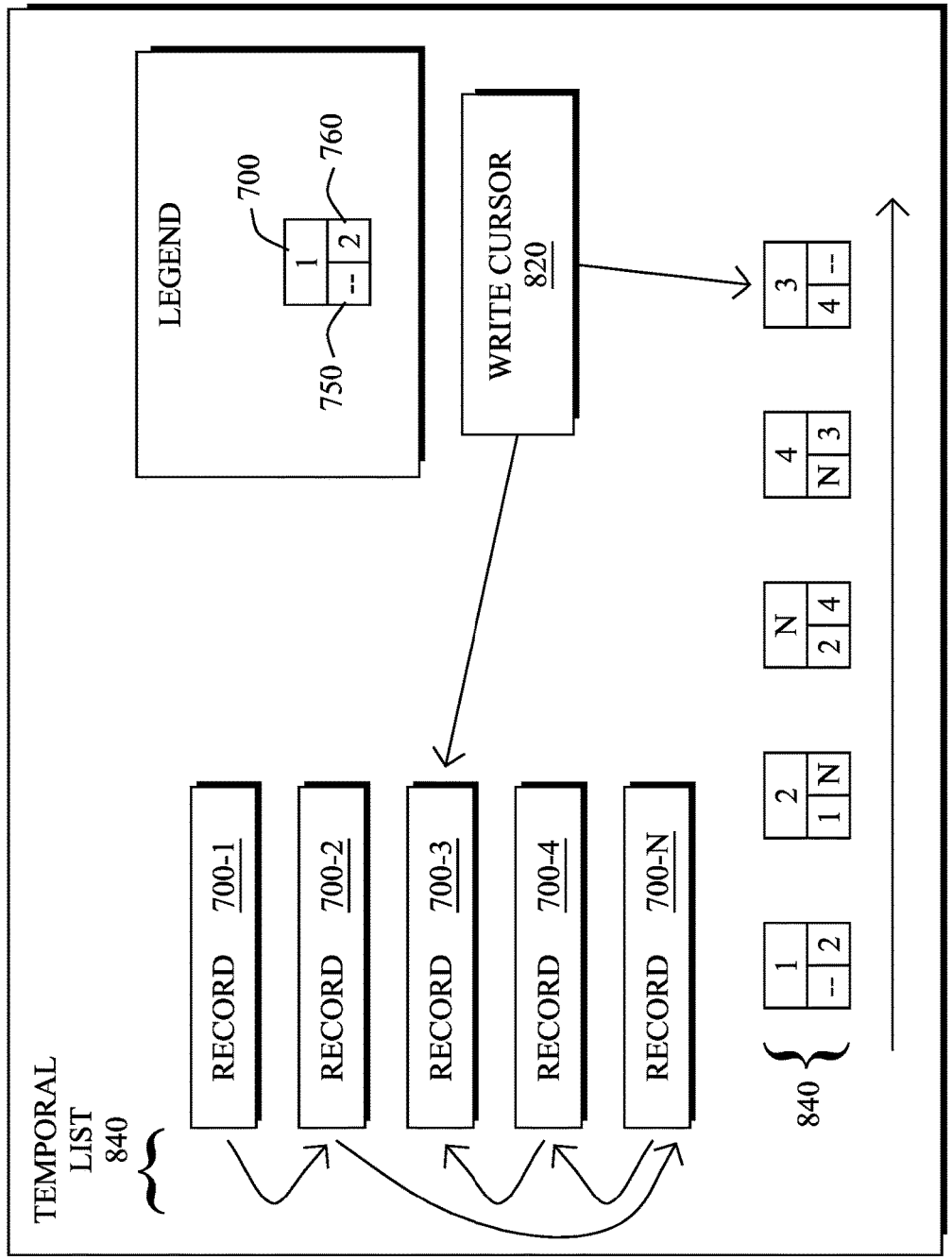

With reference to FIG. 9A-9C, whenever a record is updated (e.g., record 700-3 from an originally written state in FIG. 9A to FIG. 9B), it is moved to the "tail" of the temporal list 840 and the write cursor 820 is modified to point to this "new tail" of the list. In other words, a write cursor on the temporal list gives information about which record in the table was updated most recently. Similarly, assume that between FIGS. 9B and 9C records 700-4 and then 700-3 (again) were updated. As such, the new order of the list 840 is 700-1, 700-2, 700-N, 700-4, and 700-3, and the write cursor 820 again points to the last-written record 700-3.

The temporal list operates on the principle of state collapse. That is, once a record is inserted into the temporal list, any subsequent updates (modify or delete operations) on it will re-queue it to the tail of the list without creating any additional/duplicate nodes to distinguish between the different updates.

Figure 10A:
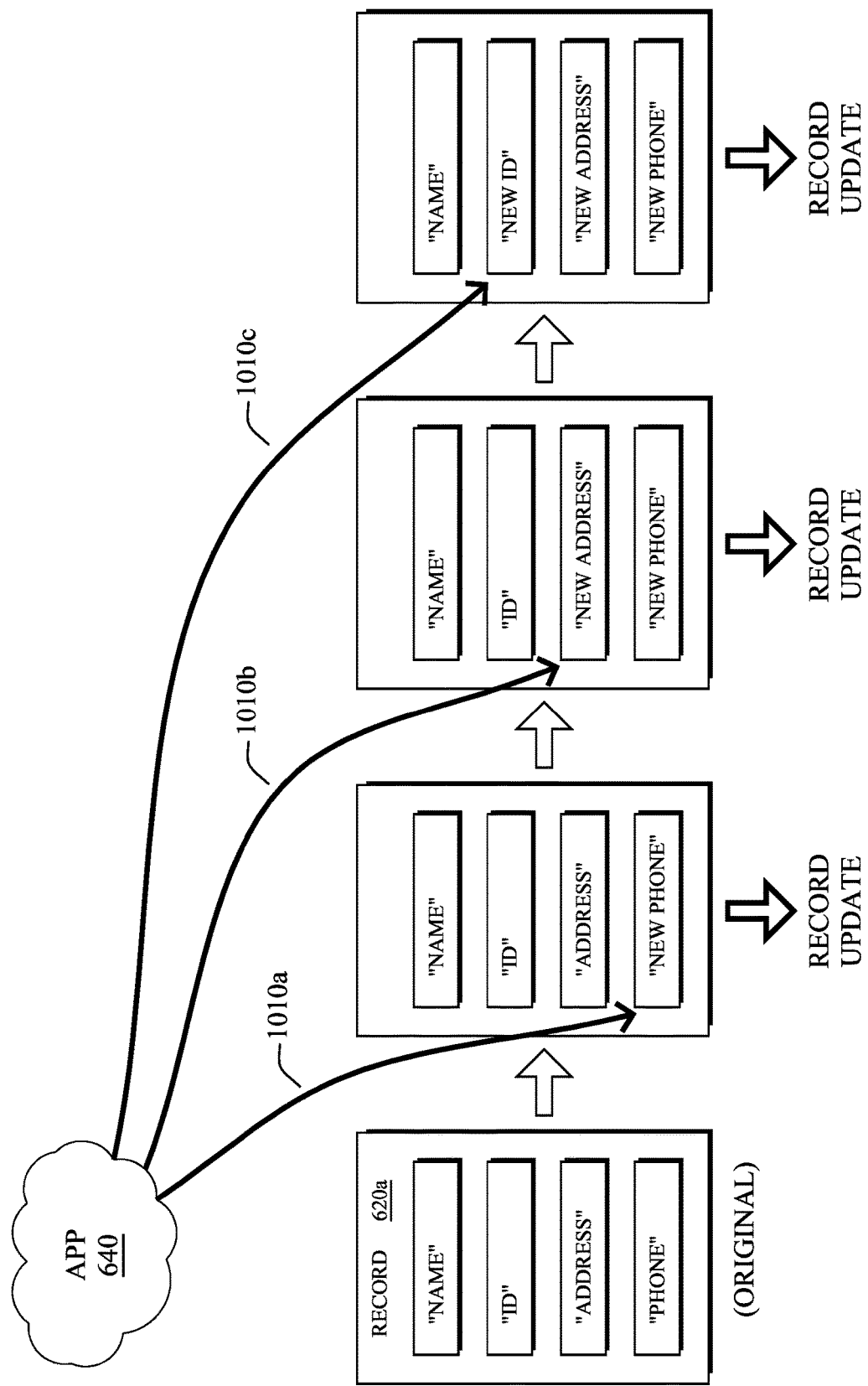
FIGS. 10A-10B illustrate an example of implicit and explicit write cursor modes.
Figure 10B:
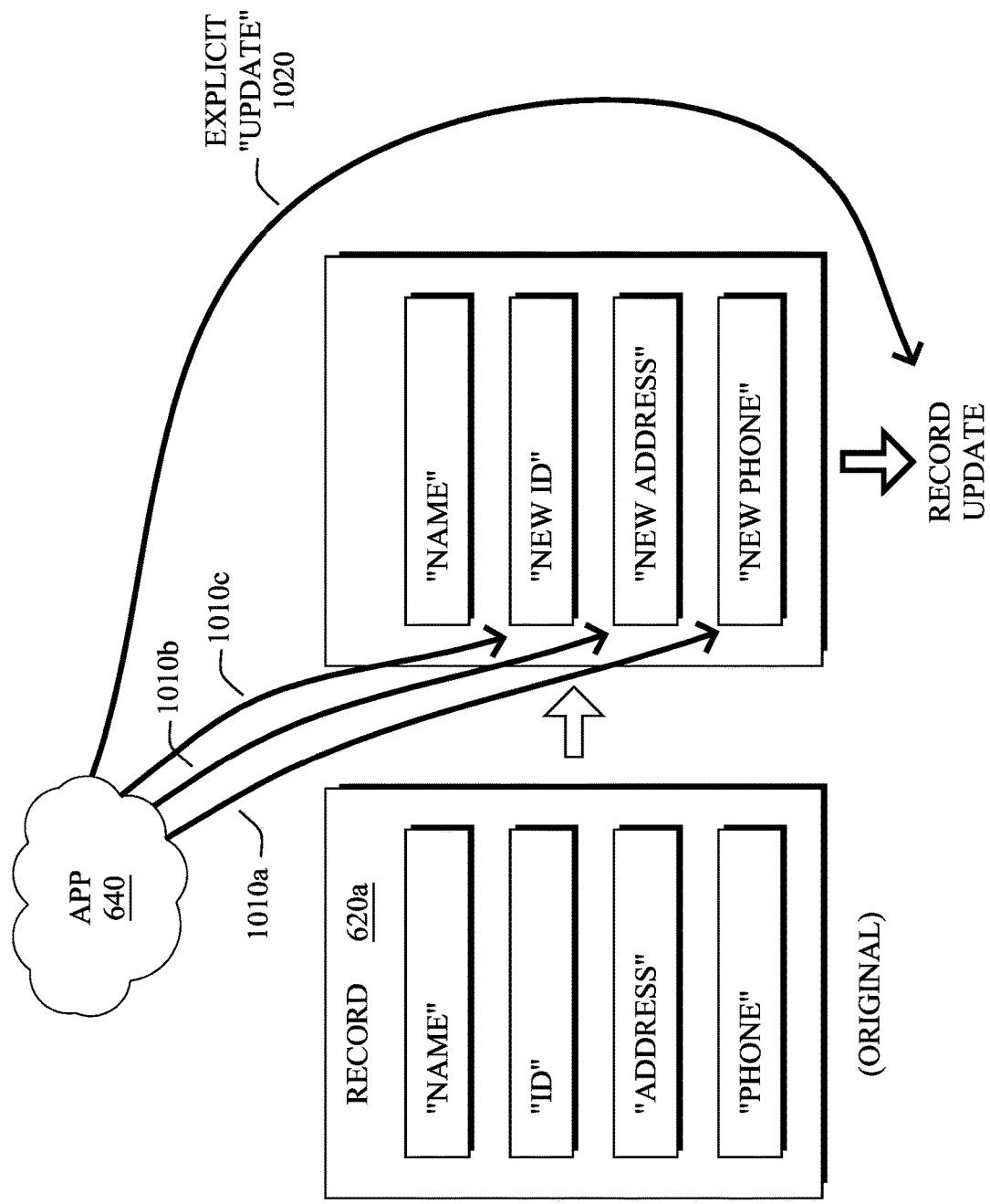
Figure 11A:
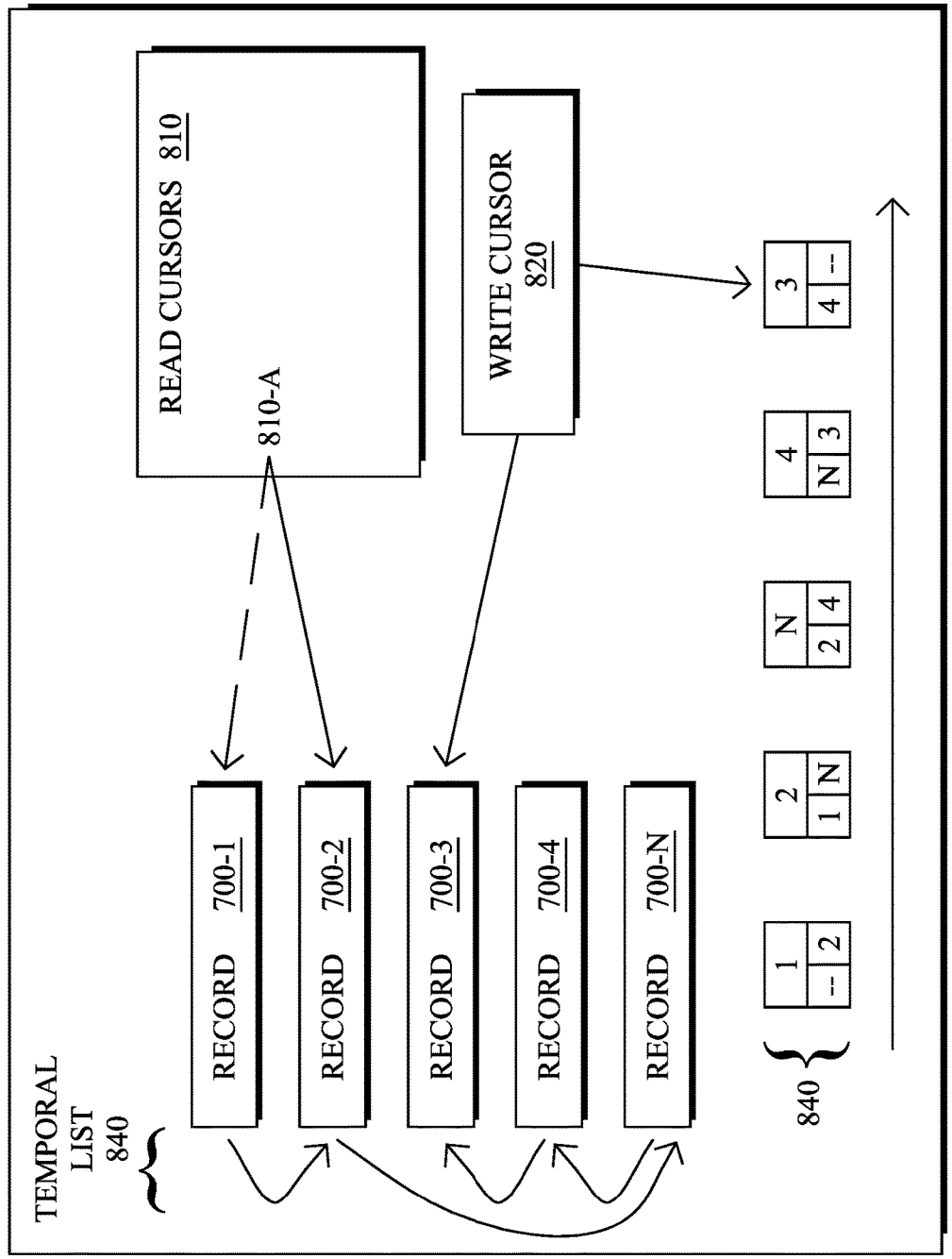
FIGS. 11A-11D illustrate an example of read cursor table traversal.
Figure 11B:
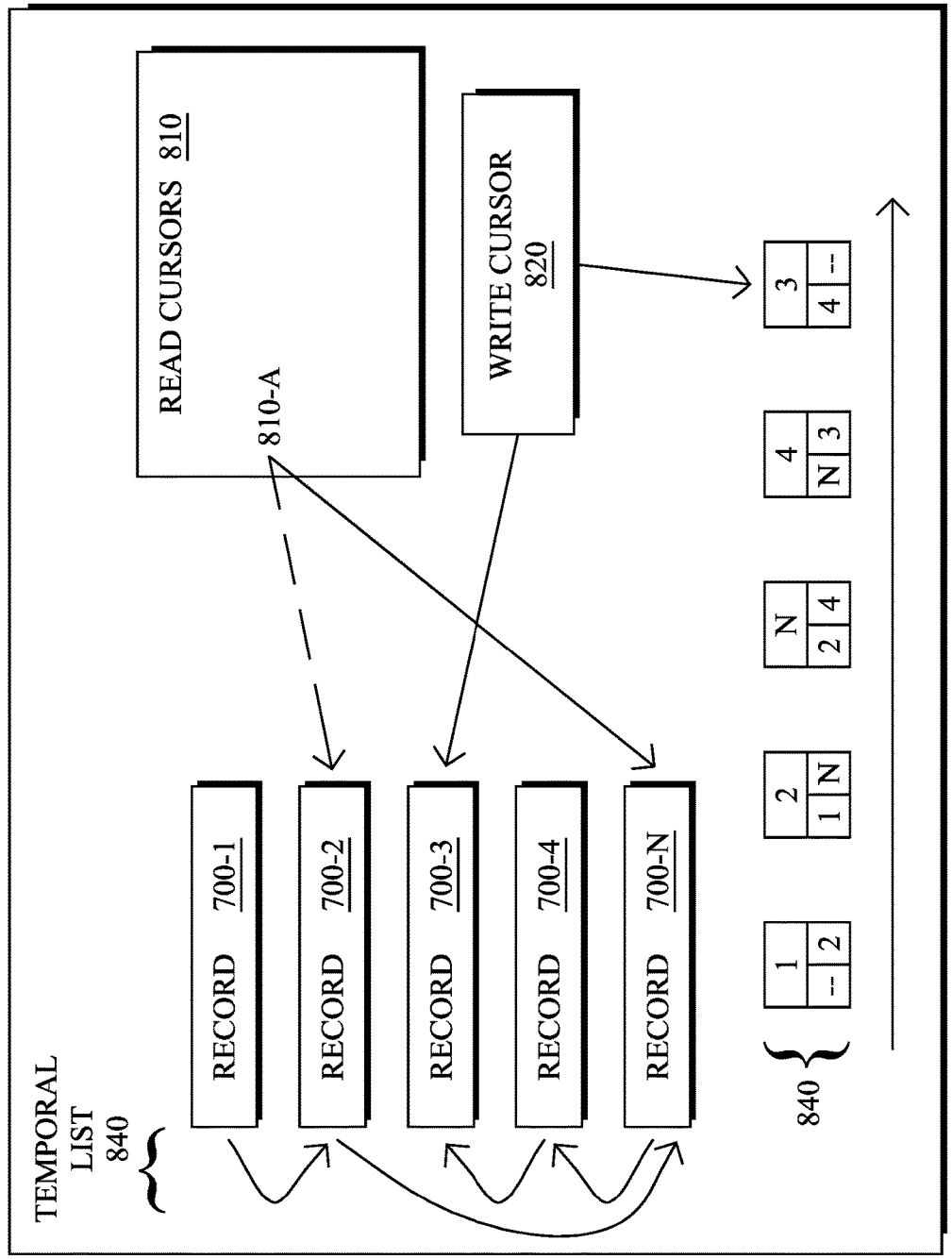
Figure 11C:
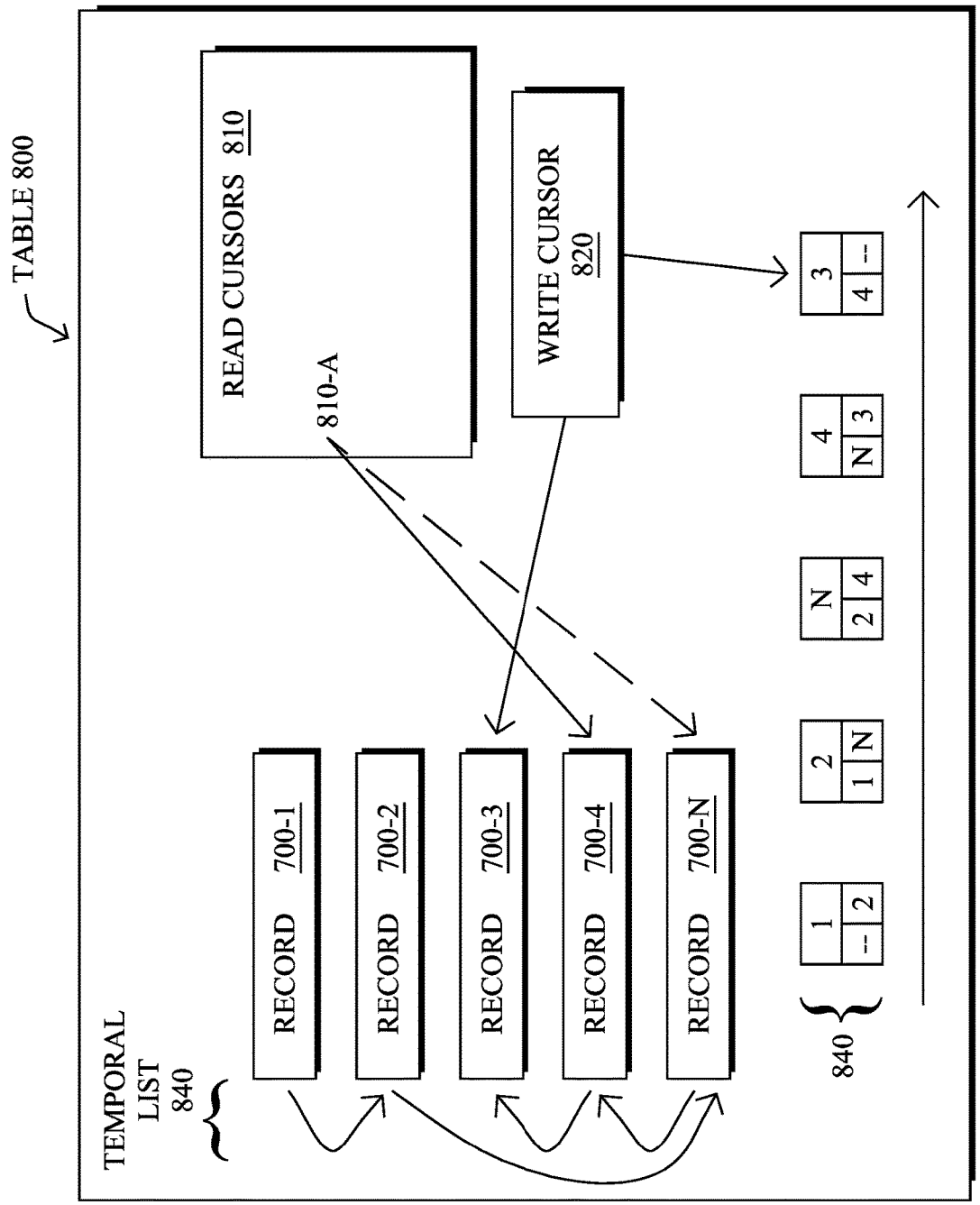
Figure 11D:
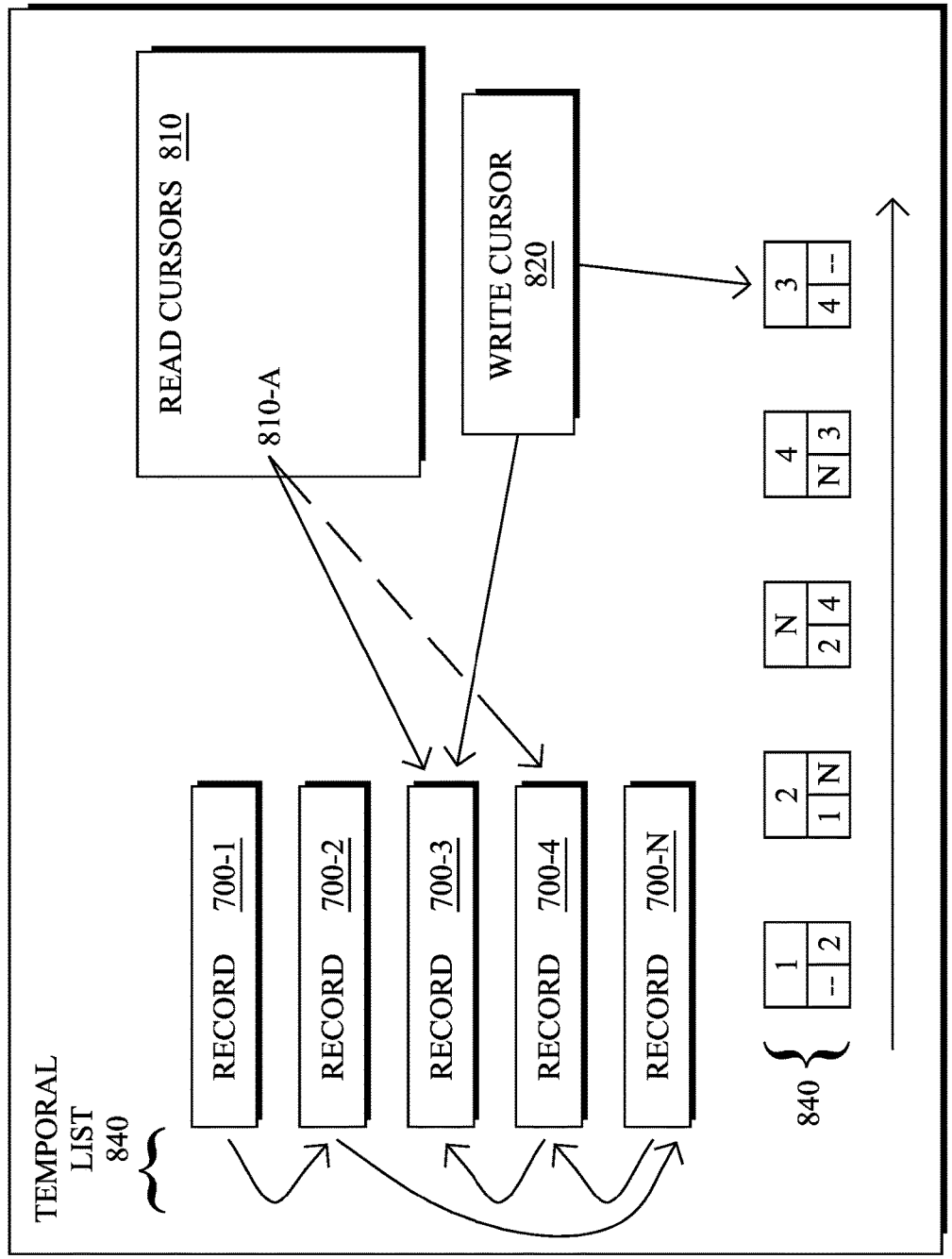

The write cursor illustratively has two modes of operation configurable by the user, implicit and explicit:

i. Implicit Mode:

The implicit mode may be a default mode of operation wherein all updates made by the writer to any fields/attributes of records in the database are tracked throughout the duration of a write operation 1010 (e.g., updates 1010*a-c*). As shown in FIG. 10A, at the time of committing each transaction, the updates are registered and the record is then re-queued automatically to the tail of the temporal list. This mode has the additional overhead of having to track all updates during a transaction (e.g., using "dirty" bits to track records modified during a transaction). However, it is friendlier from the application writer's point of view as all he/she has to do is write code to modify the database. Note that a write transaction may be based on a single record (e.g., fields/attributes within a single record) or across multiple records (e.g., fields/attributes among a plurality of records). Each update to a record, therefore, results in the corresponding record being moved to the tail of the temporal list during the implicit mode.

ii. Explicit Mode:

Sometimes the application would like to control the movement of the write cursor explicitly. In the explicit mode, as illustrated in FIG. 10B, the writer explicitly tells the database infrastructure to enqueue the record to the tail of the temporal list (e.g., instruction 1020). The advantage of doing this is that the application can keep working and making multiple updates to the same record until it is ready to publish the updates. The infrastructure doesn't have the burden of tracking all the updates, particularly since not all changes to a database record need to move the write cursor. For example, a record may only need to be replicated (described below) when it reaches a certain state, so the record should only be added to the temporal list when the record reaches the desired state. The explicit mode, therefore, is useful when an application needs to decide when a record (and thereby the operation on it) is "ready" to be inserted, and is the more efficient and recommended mode of usage, eliminating the overhead of state tracking per update (e.g., and dirty bits).

2b. Read Cursors

Any process (application) interested in getting notifications about updates on any table in a database can create a "read cursor" on it, where a read cursor is used to traverse the set of changed records ('walking" temporal list 840). A read cursor can be used per-table and per-peer for replication (e.g., a replication read cursor), or it can be used by the application itself to traverse the list of changed records (local read cursor), or it can be used for garbage collection (described below). Note that for the replication case, it is useful to have a single identification for a peer's read cursors across all tables, thus the applications may interact with the database infrastructure using a cursor name (e.g., defined by the application corresponding to the cursor). Note further that the database infrastructure may maintain a cursor-name-to-cursor-id mapping (e.g., in shared memory available across process restarts, described below).

The read cursor contains a pointer to the record it is referring to. The moment a read cursor is created, it points to the head of the temporal list. Every read cursor has a file descriptor associated with it. This file descriptor is signaled whenever there is a new update on the table. When a reader process wakes up to a notification on such a file descriptor, it simply needs to get the associated read cursor and move it forward along the temporal list, consuming data at each move, until it finally catches up with the write cursor. The "gap" or number of records between a process's read cursor and the table's write cursor at any instant of time is the number of pending updates that it has yet to consume.

With reference to FIGS. 11A-11D, to traverse the records 700 in temporal order, the records are simply traversed using the temporal list 840, i.e., the prev_rec/next_rec fields (750/760) in the record header. Whenever the read cursor 810 is moved (from dashed to solid line in FIGS. 11A-11D), the cursor is updated to the point to the next record in the temporal list. Once the read and write cursor coincide (i.e., point to the same record), the reading application is up-to-date with the updates on that particular table.

Notably, when a record in the database is changed, the application that reads the record does not receive an indication of which attributes in the records have changed, but rather the entire record is returned. If the reader application/process so desires, it can also determine which fields/attributes in a record were updated. To do this, the reader application can keep an extra copy of the latest version of records to compare the locally stored state against the updated records. (Templates may be provided to application writers in order to get callbacks for every field in the record that was updated most recently.)

Note further that since individual changes are not tracked (i.e., the state is collapsed in the record), the history of multiple changes to the same attributes may be lost (e.g., by the time the application reads the record the history of the changes are lost). However, if records collapse state, an application may be configured to determine, for example, whether an attribute has "toggled" (e.g., an attribute that tracks whether a configuration is set to 'shut' or 'no shut'). In particular, in one embodiment, attributes that toggle can be tracked by a counter and an attribute that gives the final state. For instance, a record may be created with the attributes "toggle_count", and "current_state", where the toggle_count is incremented every time the attribute changes (e.g., from shut to noshut or vice-versa). The current_state indicates what the current attribute value is (e.g., whether the current_state is shut or noshut). When the record is created, assume as an example that toggle_count is 0 and current_state is noshut (the application should store a copy of these values). Now say a sequence of configuration operations is done, from noshut to shut to noshut. The record will thus have toggle_count of "2" and final_state of noshut. When the application reads the record it will compare against the local values and know that a state transition had occurred, and also knows the current_state (noshut).

An important point to note, also, is that since the file descriptors for each read cursor are independent, read notifications that are delivered to a reader across different tables are independent. There could be situations where a reader desires cross-table dependencies in the order in which updates are notified to the application, such ordering or dependency management is taken care of by a DBDM (Database Dependency Management) layer.

3. Database Replication

According to one or more embodiments herein, the temporal list and cursor layer serve as building blocks on which in-memory databases can be replicated for high availability. In the illustrative operating system, a special database process 248 referred to herein as the "Replication Manager" (RepM or ReplM) performs the synchronization of databases from the active database (e.g., active route processor) to the standby (and other members in a stacked system if necessary).

Essentially, according to one or more embodiments herein, RepM installs read cursors on each table that it needs to replicate. Whenever a record is updated and moved to the tail of the temporal list, RepM gets notified on the file descriptor associated with its read cursor. It then moves the read cursor towards the write cursor while sending records in between them over an inter-process communication (IPC) channel to the peer/receiver RepM process. This peer RepM then writes the synced record into the corresponding standby table, thus moving its write cursor and thereby notifying the reader processes on the standby to consume the update.

Figure 12:
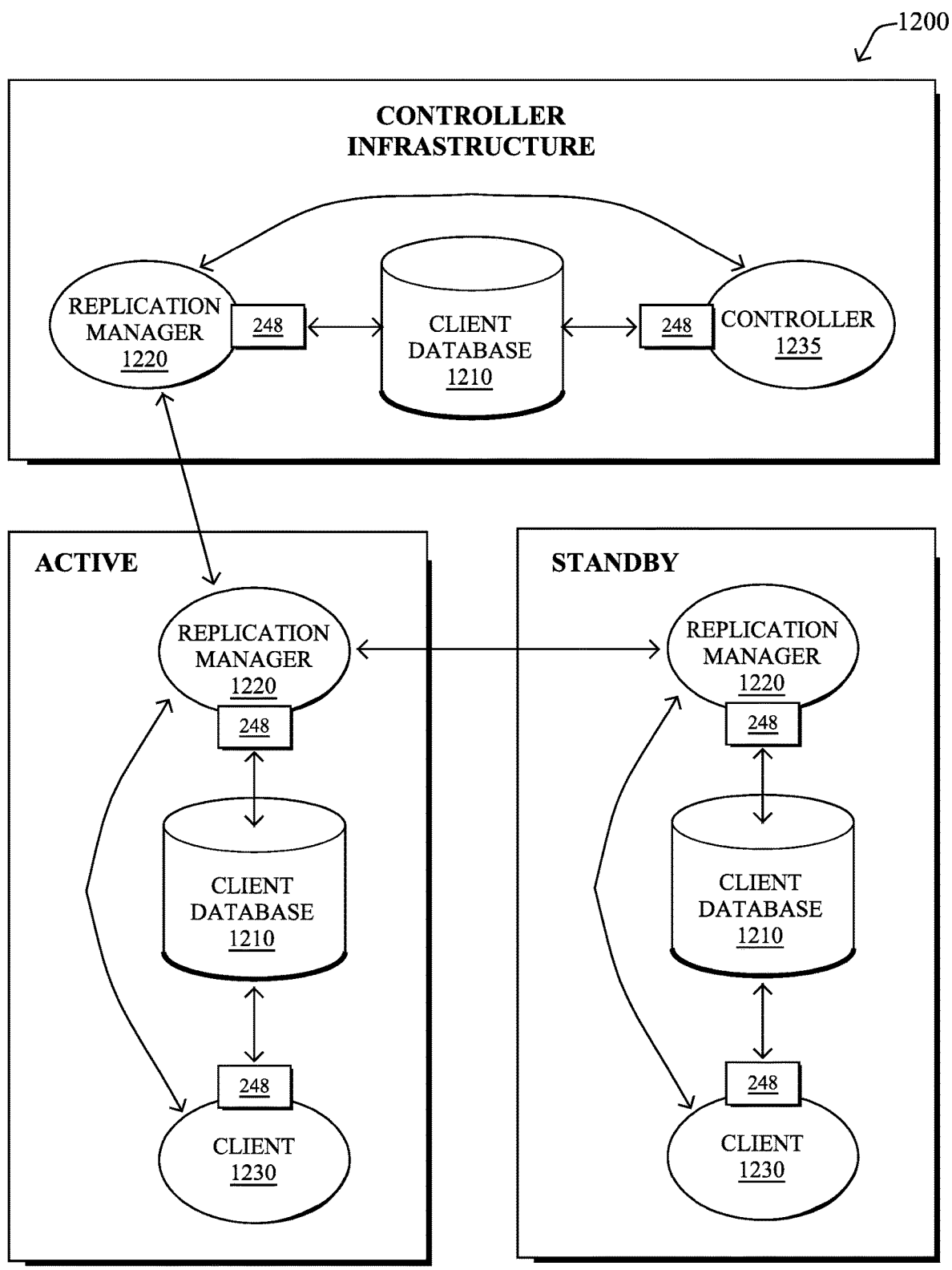
FIG. 12 illustrates an example database replication infrastructure.

FIG. 12 illustrates an example database replication scheme 1200, where a controller infrastructure interacts with an active system (e.g., an active FRU) and a standby system (e.g., a standby FRU). In particular, each sub-system has a client database 1210 (e.g., the original and the replications) controlled by a replication manager 1220. In the controller infrastructure, the client 1230 is a controller 1235. Note that the managers and clients may communicate through an IPC channel as mentioned above. (Those skilled in the art will appreciate that the arrangement shown in FIG. 12 is merely an example, and that many different configurations are suitable for use with the techniques herein. Accordingly, scheme 1200 as shown is not meant to limit the scope of the embodiments herein.)

An instance of ReplM (database process 248) will execute on all entities (e.g., chassis(s) and on stand-alone hosts such as the controller) that are either the source or receiver of replication data. The ReplM on an active FRU will be known as the master ReplM, and all other instances will be slaves of that master (Master/Slave relationship is only for the connection setup between the ReplM). Illustratively, a hub and spoke topology is maintained with the master ReplM in the middle, and replication of data can flow in any direction—from master to slave or vice versa. Notably, any process that needs to receive the replication of information will register with the local ReplM expressing the set of tables it is interested in and the source of that information. That entity will be considered as a client of the local ReplM. After the initial registration, ReplM will be responsible for independently replicating the requested tables without any intervention or assistance from the entities that source the data or are receivers of the data.

The replication infrastructure is designed to support an incremental update model. For each table in a database that needs to be replicated, the cadence of operation on the sender side is to operate it via a replication cursor (or a read cursor). This replication cursor maintains the per peer replication state. Initially all the entries in the replication table would not have been sent, this would imply that the sequence of get next operations on the replication cursor would yield entries from the head end of the temporal chain of entries to the last-written entry. Operations performed on the table will update a single write cursor (one per table) that is maintained by the infrastructure. When the read cursor reaches the write cursor there are no more entries to send. Table operations proceed to update the write cursor in temporal order, which is then seen by the read cursor.

On the receive side, the record inserts/deletes/updates that are sent from the sending side are applied to the tables. The cursor operations on the standby (replicating) database perform in a similar manner, where the application of the updates on a replicating table will cause its corresponding write cursor to be moved. The application that is looking for changes in the table will work with a read cursor. The read cursor is analogous to the replication cursor. The read cursor will provide the changeset that the application working off the read cursor has not seen yet.

The symmetry of the cursor mechanism solves the general problem of presenting to the application the changesets associated with a table. Since the cursors themselves, and the records they deliver to the application, determine whether it should be replicated and to which peer the replication occurs too, filtering and sharing concerns are delegated to the application.

Generally, the replication model described herein may be considered near-continuous replication. In particular, in one embodiment, the illustrative replication manager works only on the in-memory data, and at no point is the data that needs to be replicated obtained by reading the disk (completely eliminating costly disk accesses). Further, a database record is the unit of update as opposed to changelogs in other systems. Moreover, every time the replication manager needs to send an updated record, it just needs to dereference the record from the read cursor and pack the binary data into a transport buffer that is sent to the receiver side. Thus the replication capability comes for free with the cursor layer.

There is no need to intercept the sync operations to the disk like the prevalent database replication systems. Writes to disk happen independently (and these can also be turned off). In the explicit mode, the application is given control over what needs to be enqueued as a valid update, thereby greatly reducing the number of redundant operations that are tracked. The replication model herein, being built on top of the temporal list and cursor layer above which in itself maintains the data that needs to be replicated, relieves the replication manager from having to keep track of each and every change per table, per database.

Having mentioned this, it is important to note that replication is just one of the services enabled by this layer. The cursor layer also naturally extends to dynamic updates to a WebUI and simultaneously provides a scalable abstraction for configuration using northbound configuration agents such as a controller, CLI, and WebUI. It is also the same layer that enables applications to learn about new tables dynamically created in the database and subscribe to their updates. In particular, the database herein may illustratively contain a Table of Contents (TOC) which is updated whenever a new table is created or deleted from it. As a result, applications can create read cursors on the TOC and get create/update/delete notifications for any table being modified in the database and accordingly create or delete its read cursors on them. This is also how the replication manager is able to dynamically replicate tables that are added at runtime without the need for any extra logic. The TOC is replicated, by virtue of which new tables (and their relationships thereof) are reconstructed on the receiver end of replication. This makes it possible for applications on the redundant (recipient node) to learn about newly created tables, their relationships, and updates. The database also has a dependency management layer (described below) that guarantees that such updates are delivered to consumers in the desired order.

4. Database Data Export (Change Notifications)

An additional complementary data export architecture can built on top of the database cursor notification scheme. In particular, for network device management, having an intelligent database management layer, such as that within a computer network operating system, allows devices to notify database state changes in a controllable manner to the various management clients such as the WebUI, SNMP, or SDN Controller. The techniques herein allow for efficient exporting of records where the rate of change of such state is high (e.g., operational state from a network device). Existing database notification technologies offer basic change record change notification, but don't offer any filter layers or adaptation layers that can be programmed by a client to control the notification. Consider the WebUI as the client monitoring the operational state of a network device. Often the network data to be monitored changes more rapidly than occurs in traditional SQL databases. The attributes in a database record might be packet counters, being frequently updated 1000 of times a second, or they may be slowly changing attributes recording switch-over events. Conventional HTTP access to the Web Server uses HTTP GET to poll for state changes on the device. When you have a network device of limited resources being continually long HTTP polled, it consumes unnecessary CPU when the device state has not changed. This problem is further exacerbated when you have many management browsers polling the same device.

The techniques herein, on the other hand, do provide programmable control to the notification subscribers. For example, as described below, being able to push notification to the browser using Websocket technology, and developing a Publish-Subscribe messaging pattern to distribute the database state, alleviates the CPU burden and leverages the state collapsible database update semantic. This means that multiple readers (or taps) can be placed in the table and be consumed according to different reader specific thresholds and at different rates without causing state build up, or the need to maintain a mirror cache in the resource constrained device. CPU utilization is also kept to the minimal as only processing of incremental updates incur CPU cycles.

The specific functions that can be offered based on this database Notification management layer are:

1. There is the ability to reflect configuration state changes made at the CLI to the browser. This can inform the WebUI of database table state changes for record Create/Update/Delete operations. This would be utilizing the basic database record state change capabilities.

2. Operational state required for the monitoring of the device can now be pushed at a controlled interval or when there is a specific state change.

a. Programmed Interval dictating Notification. In the case of a database record attribute changing quickly, such as a high speed counter, the Client can dictate how frequently it sees the update. This might be per second, per minute, etc.

b. Threshold, or Range, based Notification—e.g., when the number of Errors crosses a level. The client would program the threshold, or range, for a numeric attribute in the record. Only when the attribute trends outside the range is the notification reported to the Client.

c. Rate based Notification—e.g., when a counter increases beyond a certain rate. As an example, a Client might be interested in counting Network User Authentication failures. A certain level of failures per-hour might be tolerated; exceeding this level might trigger an Alarm notification. The assumption for this capability is that there is no attribute representing this 'rate', so the database adaptation layer would maintain this rate.

d. Hysteresis based Notification.—e.g., with a lagging response where the notification is 'debounced'. As an example, suppose the range is:
  range=(10, 20)
  attr value 18, 19, 20, 21, 20, 19, 20, 21, 22, 23
    For this sequence, you would only generate one notification for the first time the attr value crossed the value 20. You only need to know the range was exceeded the first time, and no more, and nor by how much. It is an efficient way of removing noise from the notification, and is a simple way to reduce the rate of notifications. The next notification can only occur when the attr value crosses the minimum of 10. In the series below, that would be when the value crosses below 10, to 8 for the first time.
  attr value 18, 15, 12, 8, 5, 9, 12, 9, 5

Figure 13:
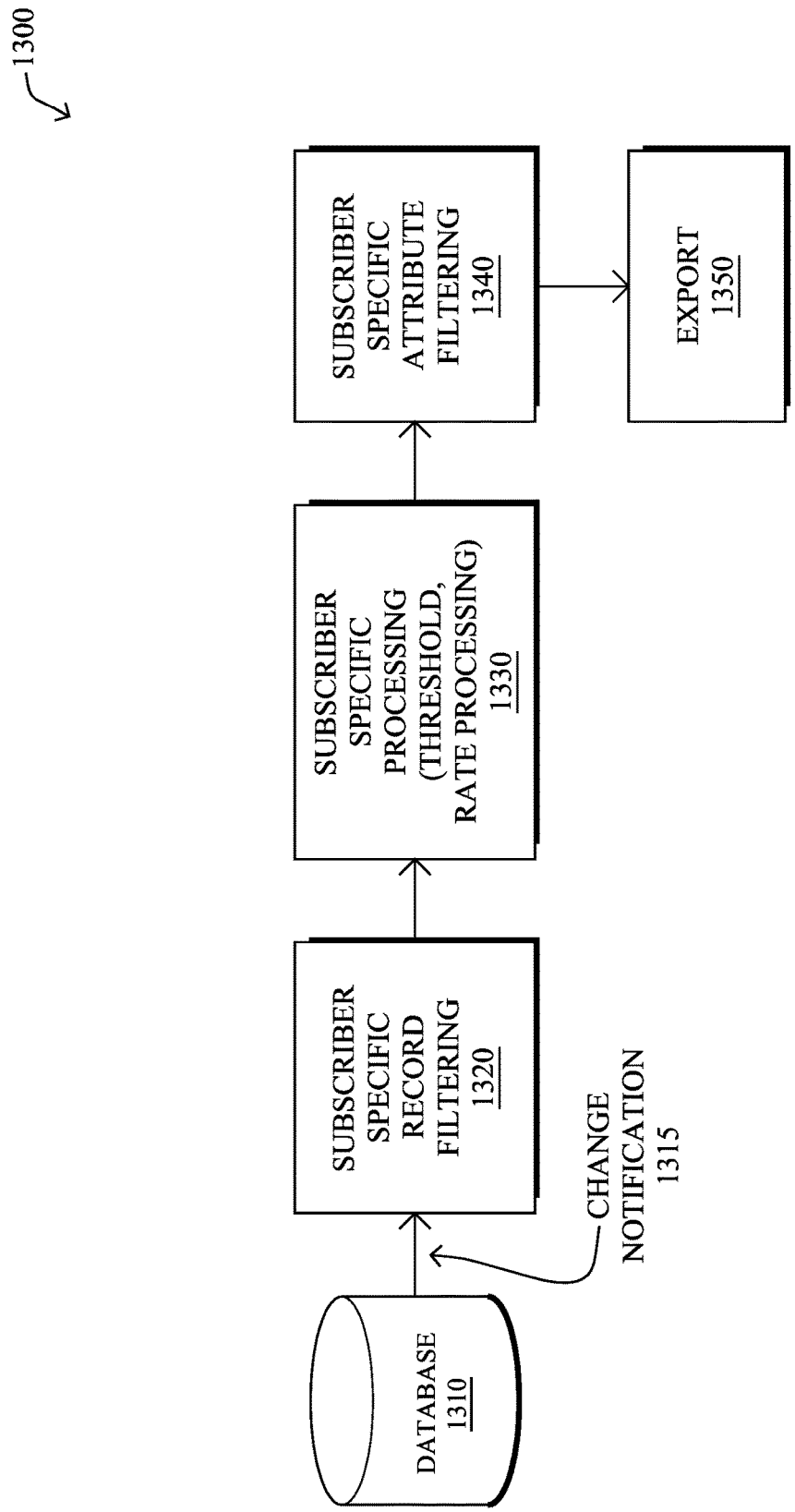
FIG. 13 illustrates an example notification filtering process.

Regarding the programmable state change notification of the techniques herein, as described above, with each subscription the techniques herein support the ability to specify and enforce subscriber specific criteria (e.g. push intervals, thresholds, etc.). The techniques herein also support the ability for subscriber to place filtering criteria as well as specify the attributes within a record that are 'interesting' and to be published. The diagram in FIG. 13 illustrates the processing flow 1300 for handling the change export.

In particular, incremental changesets from the temporal queue described above are serviced from the database 1310 at a programmed interval using a managed timer in order to push to the subscribed clients. If an interval is not specified, the updates are pushed to the subscriber as soon as the exporter has the chance to run.

Once a dirty record is notified out of the database (1315), subscriber specific processing for the exporter involves record level filtering (1320) as a first phase. In particular, a subscriber is able to specify (e.g., via a binary filter) any records within the table to be watched, thus enabling the subscriber to quickly filter out any uninteresting record updates at the source.

For any attribute being 'watched', in a second phase (1330) a reference threshold, range, or rate for the numeric attribute in the database record is maintained in a subscriber specific shadow structure. For threshold processing, a comparison of the counter in the record is made against that of the reference threshold and the notification forwarded if the record value exceeds that of the reference threshold. For the range processing, if the value of the record attribute falls under the referenced range, the notification is exported. Lastly for rate processing, there is a monotonously increasing counter (e.g., 64-bit) that is maintained and updated each time the attribute is changed. The last seen value of this counter is cached at the shadow structure. The latest value in the record, together with the last seen value in the shadow, and the subscriber specific processing time interval are used to compute the rate-of-change. If the rate-of-change exceeds the referenced rate, the notification is exported. The shadow is then updated with the new last-seen value.

Note that a record delete notification bypass thresholding check as the delete has to be sent to the subscriber.

The hysteresis implementation maintains three shadow variables associated with the database table—the last_notified_change, and the range_min and range_max ranges. When the attribute number value is such that, range_min<attr<range_max, there is no notification generated. When the attribute transitions such that attr>=range_max, notification would be generated to the subscriber for the attribute value exceeding the range, and only if the last_notified_change variable is not set to range_max. After notification the variable would be set as last_notified_change=range_max. Similarly, only when the attribute transitions below the range_min is the notification generated for the negative response. Again, only if it differs from the previous last_notified_change value was not already set to range_min. The variable would then be updated as last_notified_change=range_min.

The third phase (1340) of the processing involves the filtering of any record attributes that are not interesting to the subscriber. A subscriber during the placement of the subscription, can optionally specify the list of interesting attributes. This may be done via the specification of the parameter list using certain parameters (e.g., based on efficient graph database traversal). For example, if only certain attributes of an entire record are of interest, those interesting attributes may be separated from the rest of the uninteresting attributes prior to distributing the data to the subscribing client.

The final stage of the processing is the notification export (1350). Here the structured data is marshalled into contiguous buffer to be forwarded to the subscriber.

5. Support for Garbage Collection

Since the databases are shared among different processes, a record that needs to be deleted cannot be wiped out immediately when a writer tries to delete a record. The record should be destroyed only after all processes reading from that table have seen and processed the delete event. In other words, the record can be freed only after all read cursors of different processes have moved past that record in the temporal list. This includes the read cursor that replicates the delete to the standby.

Hence, when a record needs to be deleted, the writer simply calls an API that marks the record for deletion and moves it to the tail of the temporal list. Eventually, when all processes have consumed this update and moved the read cursors past it (i.e., have been informed that the given record has been marked for deletion), the record is destroyed from the database by a special garbage collector routine.

Figure 14:
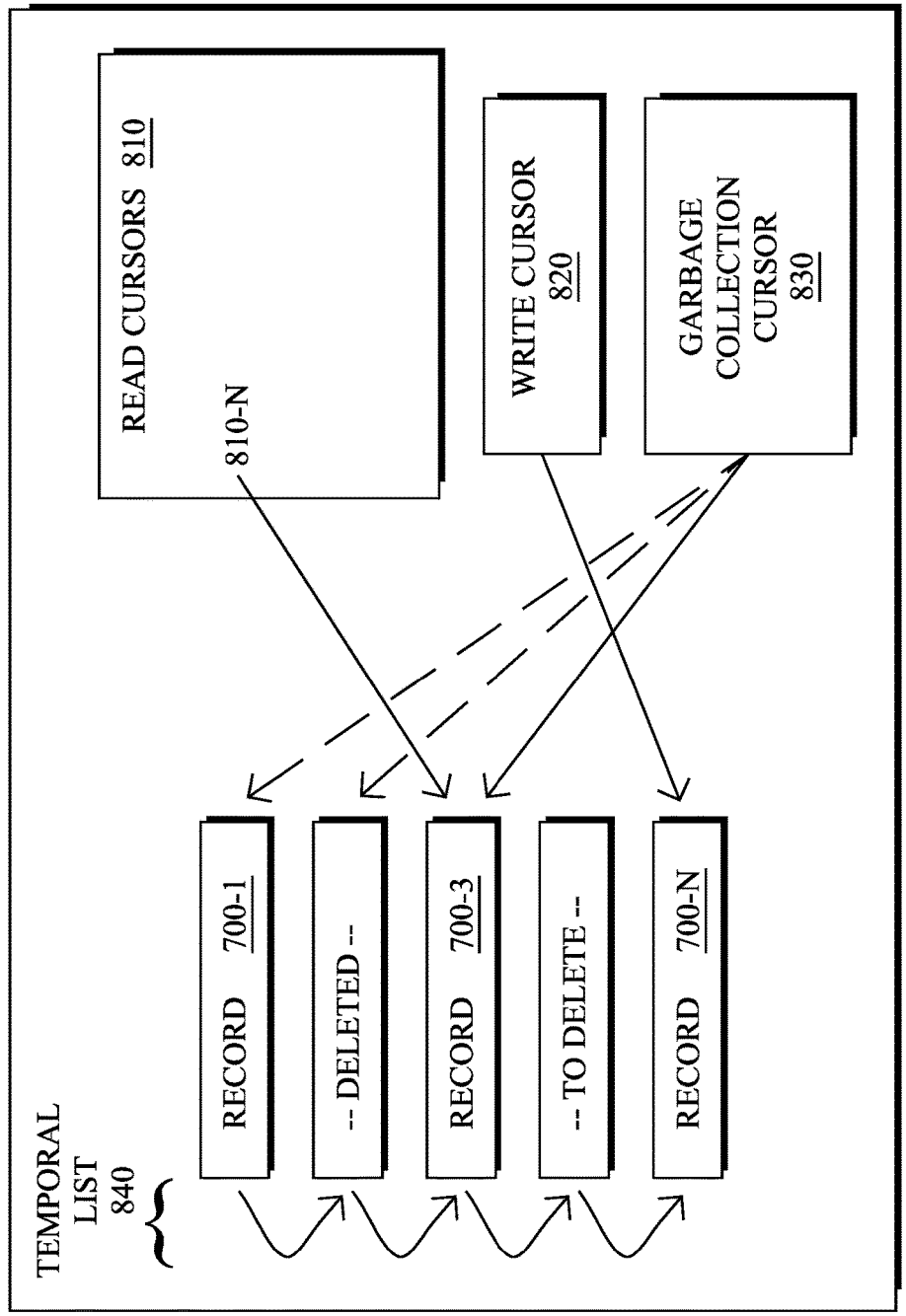
FIG. 14 illustrates an example garbage collection process.

The garbage collector also tracks the write cursor using a "garbage collector cursor" (or gc_cursor) 830 and runs periodically in the context of RepM. Essentially, similar to a read cursor, the garbage collection process walks through the temporal list of updated records and seeks out those marked for deletion, and deletes them (removes them from the database) until reaching the write cursor (the last updated/written record). To meet the criteria above, however, if the garbage collector cursor points to any current read cursor of an application, then the garbage collection process waits for that read cursor to move along. An example of the movement of the garbage collection process (and garbage collector cursor) is shown in FIG. 14, where, as noted, the garbage collector cursor 830 removes records marked for deletion until reaching either a read cursor (as shown), or the write cursor (i.e., in the event all applications and associated read cursors are up-to-date). Note that records that have been seen by all read cursors but are still held by the DBDM layer may be skipped by the garbage collector during its run. These are be destroyed by DBDM when the dependencies are fulfilled.

In this manner, record deletion from the database occurs in controlled manner. The record cannot be immediately deleted and removed from the database, since all peers interested in the to-be-deleted record need to be notified of the deletion first. Note that tables that are not to be marked for replication or that do not have any cursors on them may simply delete and destroy records without dependence on any application or replication process having read the record first.

6. Simple Stateful Restarts

At any point in time, a planned or unplanned restart could occur. The only requirement on persisted messaging layers is that on a restart there will be a potential replay of the last set of in-flight operations. The input layers that consume the output of the restartable processes are expected to be idempotent.

The focus is to treat planned and unplanned restarts identically to avoid the proliferation of special case code paths that are conditional on the type of restart. Such code is in the less tested paths, which are exercised during installation operations when the overall system is most fragile. Bringing in alternate special case code paths that have different timing characteristics and is potentially less tested is really not a good way to build a reliable system. Further the need to handle restarts gracefully is a powerful building block that also obviates the need for global synchronized restart models for upgrade which by definition are fragile and do not lead to a good end user experience.

According to the techniques herein, therefore, since cursors are stored in the database and as a result, are available across process restarts, when a process restarts following a failure, new read cursors need not be created to re-create its previous state. All it needs to do is call API's to get its existing read cursors and move them back to the beginning of the temporal list.

The temporal list and cursor layer together comprise key elements in the foundation of the entire manageability story for the illustrative operating system. It enables co-dependent services and features to rendezvous on data stored in shared memory while preserving the ACID (Atomicity, Consistency, Isolation, Durability) properties of the databases.

Without writing any extra logic, application data services such as dependency management and replication are very easily achieved by simply turning on this capability for any table in any database. The performance potential shown by this infrastructure has made it they cornerstone for the configuration, state distribution and statistics reporting services for the operating system Controller.

7. Flow Charts and Final Comments

Figure 15:
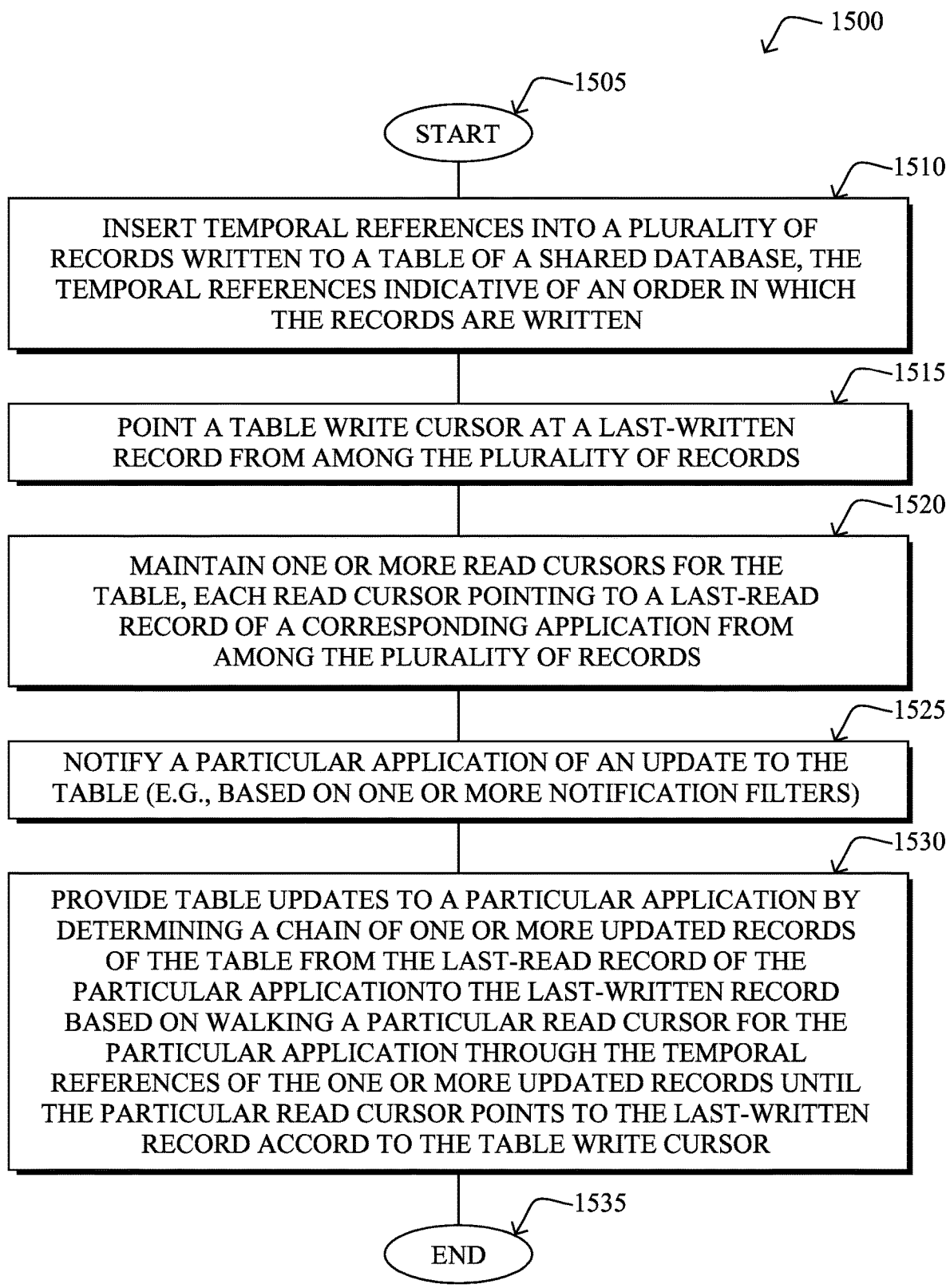
FIG. 15 illustrates an example simplified procedure for a cursor-based state-collapse scheme for shared databases, particularly from the perspective of a database.

The techniques described above provide for a cursor-based state-collapse scheme for update tracking, reader notification, and network-wide replication for in-memory transactional databases. FIG. 15, for instance, illustrates an example, simplified, and generalized procedure for a cursor-based state-collapse scheme in accordance with one or more embodiments described herein, particularly from the perspective of the cursor management process 248 (e.g., cursor layer) on the database. The procedure 1500 may start at step 1505, and continues to step 1510, where, as described in greater detail above, comprising cursor management process 248 (e.g., cursor layer) inserts temporal references (e.g., prev_rec 750 and next_rec 760) into a plurality of records 700 (620) to a table (800) 610 of a shared database (600), the temporal references indicative of an order in which the records are written (temporal list 840). Said differently, by inserting the temporal references, by the end of a series of operations, for each table in a database, there is a sequence of records that have been updated. Notably, when a record is moved to the tail of the temporal list, prior to writing the written record, the written record contains temporal references pointing backward (prev_rec) to a previous record, and pointing forward (next_rec) to a next record (e.g., records A, B, C, in order, where B points back to A, and forward to C). As such, the temporal references of the previous record may need to be adjusted to point forward to the next record (e.g., A forward to C instead of B), the temporal references of the next record may need to be adjusted to point backward to the previous record (e.g., C backward to A instead of B).

In step 1515, a table write cursor 820 is pointed at a last-written record from among the plurality of records, as described above. That is, when a record is modified (e.g., unlinking the record from its current position in the temporal list and adding it to the tail), the table's write cursor is also moved to its tail. As mentioned above, pointing the table write cursor at the last-written record may either be in response to receiving an update to a field of the last-written record (implicit mode), or else in response to receiving an explicit instruction from a given application that updated the last-written record (explicit mode).

As also described above, the cursor layer maintains one or more read cursors 810 for the table in step 1520, where each read cursor points to a last-read record of a corresponding application from among the plurality of records. Note that in the instance of replicating the shared database (e.g., active) to a secondary (e.g., standby) database, then one of these one or more read cursors of the table corresponds to the secondary database, accordingly.

In step 1525, in response to updates (modify, delete, etc.) to the records of the table/database, the cursor layer may notify particular applications of the updates. As described in detail above, the notification may be based on one or more notification filters. For instance, in response to determining a change to a particular value within a given record of the plurality of records, the database manager (or other related export process) may determine whether the change to the particular value surpasses a notification filter, prior to exporting a change notification for the given record to one or more applications (e.g., at a next export interval). As detailed above, the notification filter may be defined by (and corresponds to) each of the one or more applications individually, and may be based on a threshold of change, a rate of change, a hysteresis-based threshold/rate of change, or simply always sending a delete notification.

According to the techniques herein, the cursor layer provides, in step 1530, table updates to a particular application by determining a chain of one or more updated records of the table from the last-read record of the particular application to the last-written record based on walking a particular read cursor for the particular application through the temporal references of the one or more updated records until the particular read cursor points to the last-written record according to the table write cursor.

The procedure 1500 may illustratively end in step 1535, generally with the option to receive further write instructions (modify/delete) and/or provide updates to consuming applications during operation of the database. Notably, as mentioned above, deleting records (e.g., garbage collection) may only occur in response to all applications (associated with the one or more read cursors) having been informed of the given record being marked for deletion. Also as mentioned above, the techniques herein may be configured to manage cross-table dependencies appropriately.

Figure 16:
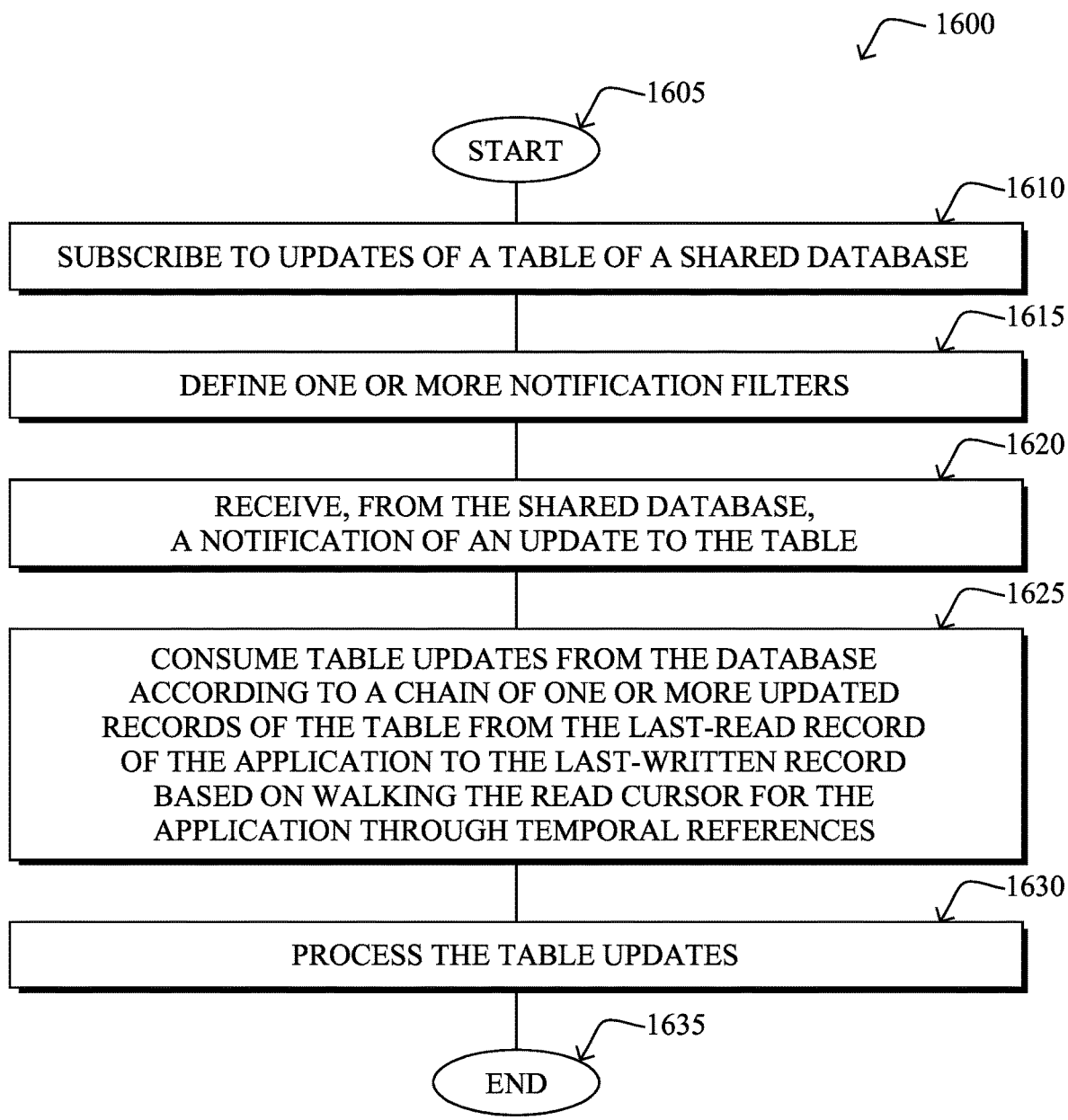
FIG. 16 illustrates another example simplified procedure for a cursor-based state-collapse scheme for shared databases, particularly from the perspective of an application.

In addition, FIG. 16 illustrates another example simplified procedure for a cursor-based state-collapse scheme in accordance with one or more embodiments described herein, particularly from the perspective of the database subscriber (database application 248 on an application and/or replicator). The procedure 1600 may start at step 1605, and continues to step 1610, where, as described in greater detail above, an application subscribes to updates of a table of a shared database. Again, the table has a plurality of records with temporal references written into the records indicative of an order in which the records were written into the table, a table write cursor pointing at a last-written record from among the plurality of records, and a read cursor pointing to a last-read record of the application from among the plurality of records. Note also that as mentioned above, in step 1615 the application may define one or more notification filters.

In step 1620, the application may receive, from the shared database, a notification of an update to the table, and in response, in step 1625 may consume table updates from the database. As mentioned above, the database may complete this task by determining a chain of one or more updated records of the table from the last-read record of the application to the last-written record based on walking the read cursor for the application through the temporal references of the one or more updated records until the read cursor points to the last-written record according to the table write cursor. Accordingly, in step 1630, the application processes the table updates.

The simplified procedure 1600 then illustratively ends in step 1635, notably with the option to receive further notifications, or to create or adjust notification thresholds, as mentioned above. Note also that, as described above, in response to restarting the application, an associated read cursor may be reset to point at an earliest-written record from among the plurality of records of the table based on the temporal references, such that all of the records of the table are refreshed through consumption in steps 1625 and 1630 (i.e., the reset read cursor forces a walkthrough of the entire temporal list).

It should be noted that while certain steps within procedures 1500-1600 may be optional as described above, the steps shown in FIGS. 15-16 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1500-1600 are described separately, certain steps from each procedure may be incorporated into each other procedure, and the procedures are not meant to be mutually exclusive.

The techniques herein, therefore, provide a the temporal list and cursor mechanism to be simultaneously threaded into tables that allow for state-collapsed notifications, replication, and stateful restarts, among other features described above, which may be associated with the following advantages:

1. The state-collapse model prevents state build-up thus allowing efficient support for handling large scale or bursty database operations. It also saves replication bandwidth by only sending out the latest update that has not been consumed by the manager.

2. The temporal list and cursor layer have the uniqueness of being a single layer that can be used by writers to update the database as well as readers to get notifications for those updates. As a result, the same infrastructure provides for data replication across devices, notifications due to updates from different manageability agents like CLI, WebUI, etc. It is also the layer that enables push notifications on the operating system WebUI from associated network devices.

3. The techniques herein help database readers consume and process updates independent of each other and not be held back by the slowest reader.

4. The techniques herein do not require any special configuration for the database and works equally well in standalone as well as distributed systems.

5. The techniques herein can be used by readers to determine which records in a table have changed, and also which of their fields changed.

6. The techniques herein support multiple writer modes which offer the application writers more flexibility while making an informed decision regarding simplified code versus greater overall efficiency.

7. The techniques herein reduce memory footprint due to the embedded temporal list, e.g., making use of the DL database record structure.

8. The techniques herein seamlessly make use of the built in database dependency management (DBDM) layer guarantees in-order updates to subscribing applications.

9. The techniques herein provide for a simple and robust restart and recovery mechanism for processes by virtue of the in-memory transactional database. Very minimal restart logic is necessary for processes using this infrastructure.

10. As compared to other schemes, the data replication model enabled by this layer is an "eventual-consistency" one, as opposed to strict lock-step which has performance implications.

In particular, as noted above, the techniques herein accommodate different consumer rates and yet guaranteeing in-order updates to them. That is, more often than not, applications have certain requirements on the order in which they expect updates. For example, a particular wireless feature may expect to find a valid record in table B for every update on a corresponding record in table A. There are similar dependencies during delete operations too. To solve this, the temporal list and cursor layer have integrated support for dependency management through the Database Dependency Manager (DBDM) layer. Multiple processes having different cross-table dependencies on tables in the same shared database can register independently for guaranteed in-order update notifications. For each process that registers with it for dependency management, DBDM overlays its own separate graph over all the records that need to be managed. Each node in the graph contains information about the state of the object, whether the dependency has been met and so on. When a dependency is fulfilled, DBDM allows the corresponding dependent objects in the DB to be presented to the application. Until then, updates on such records are not presented to the application and all the application does is move its read cursor from one record to another (after the initial wake-up notification) and at each step, pass in a reference to the record for dependency management. DBDM can also handle out-of-order incoming updates, which means that despite the unpredictable order in which database update notifications from different tables are fed to DBDM, it will present them to applications in the order that they desire. The dependency overlay is separate for every process and each process's read cursor moves independent of other read cursors. As a result, processes reading from the DB can be independently notified about changes on co-dependent tables' objects as long as their read cursors have seen the updates. In other words, a process's consumption of updates is not impeded in any way by a possible slow reader.

Notably, the dependency management layer caters to the following types of dependencies:

1. Tables in a flat hierarchy having different types of keys but dependent records.

2. Grouping: Tables with information about a single object (say an access point) spread across them using records with the same key.

3. Nested or hierarchical tables: Tables whose records have references to other tables whose records in turn refer to others, thus forming a hierarchy.

Furthermore, the cursor layer may also provide flags per read cursor to determine whether bulk sync has been completed for any table (from the point of view of the replication manager) and knows when it is in an incremental sync mode. Apart from this, the cursor functionality makes it possible for applications to register with a "bulksync-complete-notification" mechanism which is used when applications on the receiving node can go into full operation only after initial config has been applied and consumed.

Notably, the techniques herein may be differentiated from previous systems in numerous manners. For instance, the techniques herein may relate to a relational database as opposed to the document oriented one. Also, the techniques herein generate a notification upon modification for every table in which a reader has expressed interest. That is, the techniques herein are a state-collapsed model, which means that no extra copies of the update are stored, thus saving on memory. Upon being notified, all a reader needs to do is call API's to traverse the latest changeset of records (from the previous update). Moreover, the techniques herein provide a state-collapsed model and temporal ordering that allows eliminating the need for storing sequence numbers, and provide the provision for programmers to use (if at all needed) existing templates that were written in order to determine which specific fields in any update record were modified. Further, the added memory and processing overhead associated with stream storage and processing is eliminated by the techniques herein, and the techniques herein do not enforce any restriction on the size of the tables. This flexibility in size also ensures that all the data is faithfully preserved, thus the reader can subscribe to update notifications from any table in the database without the fear of any data being overwritten. Still further, the techniques herein need no special configuration for the change notification or replication functionalities to work, nor do they require any extra memory for the storage of updates (the state-collapse model followed allows for increased efficiency in terms of memory and bandwidth).

Even further still, the techniques herein generate and persist a notification to the application until it is consumed. Multiple records in a table could have been updated by the writer in a transaction. However, only one notification will be sent to the reader for these updates. This notification is persisted until the application has consumed all the pending updates. Also, even if multiple readers are interested in getting notified about updates on the same table, each one is allowed to independently process them. Thus all the readers will consume all the updates at their own pace and will not be held back by the slowest reader. Further, once a notification is generated, the techniques herein allow applications to walk the latest set of updates in a table and also determine which records in it changed. The techniques herein also provide the support for applications to get called back for each field that got updated in a record, if they need such granularity.

In addition, the techniques herein allow syncs to multiple consumers to happen independent of each other, and allow for any update operations to be written to the database whenever required (no buffers are maintained). Moreover, the techniques herein don't need to use any windows as records have the duality of being in tables and a temporal list at the same time to assist with notifications as well as replication. Also, the techniques herein use a state-collapse method, where multiple updates to the same record across different transactions will be collapsed into a single one. The reader's cursor will only see the last update and any updates after the reader sees the update will again be state-collapsed and moved to the tail of the temporal list thus making sure that the reader will not miss any update. This also saves bandwidth when it comes to replication since multiple copies of the same record won't be sent out. It also eliminates the overhead of having to maintain sequence numbers. Lastly, shadowing, i.e., maintaining a copy of the same record (tagged according to the source), is supported by the techniques herein, which allows determining exactly which attributes in a record were modified in a transaction, thus enabling very application callback functions at a per-attribute level.

While there have been shown and described illustrative embodiments, it is to be understood that various other adaptations and modifications may be made within the spirit and scope of the embodiments herein. For example, the embodiments have been shown and described herein using certain terminology and operating system references. However, the embodiments in their broader sense are not as limited, and may, in fact, be used with other types of operating systems, whether for computer networks or computing devices in general, and with other types of databases (e.g., graph, relational, etc.). In addition, while certain protocols may have been shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    inserting, by a cursor management process, temporal references into a plurality of records written within a table of a shared database, the temporal references indicative of an order in which the records are written;
    pointing, by the cursor management process, a table write cursor at a last-written record from among the plurality of records;
    maintaining, by the cursor management process, one or more read cursors for the table, each read cursor pointing to a last-read record of a corresponding application from among the plurality of records; and
    providing, by the cursor management process, table updates to a particular application as a state-collapsed model by determining a chain of one or more updated records of the table from the last-read record of the particular application to the last-written record, the chain of one or more updated records determined by walking a particular read cursor for the particular application through the temporal references of the one or more updated records until the particular read cursor points to the last-written record according to the table write cursor, wherein in a state-collapsed model the updates are collapsed into a same physical copy of a given record.

2. The method as in claim 1, wherein pointing the table write cursor at the last-written record is based on receiving an update to a field of the last-written record.

3. The method as in claim 1, wherein pointing the table write cursor at the last-written record is based on receiving an explicit instruction from a given application that updated the last-written record.

4. The method as in claim 1, further comprising:
    deleting a given record of the plurality of records only once all applications associated with the one or more read cursors have been informed that the given record has been marked for deletion.

5. The method as in claim 1, further comprising:
    replicating the shared database to a secondary database, wherein one of the one or more read cursors of the table is used for replicating the shared database to the secondary database.

6. The method as in claim 1, further comprising:
    notifying the particular application of an update to the table, wherein the providing table updates is based on the notifying.

7. The method as in claim 1, further comprising:
    determining a change to a particular value within a given record of the plurality of records;

determining whether the change to the particular value surpasses a notification filter; and based on the change surpassing the notification filter, exporting a change notification for the given record to one or more applications at a next export interval.

8. The method as in claim 7, wherein the notification filter is defined by, and corresponds to, each of the one or more applications individually.

9. The method as in claim 7, wherein the notification filter is selected from a group consisting of: a threshold of change; a rate of change; a hysteresis-based threshold of change; a hysteresis-based rate of change; and always sending a delete notification.

10. The method as in claim 1, further comprising:
managing cross-table dependencies.

11. The method as in claim 1, wherein prior to writing the written record, the written record contains temporal references pointing backward to a first record of the plurality of records and pointing forward to a second record of the plurality of records, the method further comprising:
adjusting the temporal references of the first record to point forward to the second record; and
adjusting the temporal references of the second record to point backward to the first record.

12. A tangible, non-transitory, computer-readable media having software encoded thereon, the software, when executed by a processor, operable to:
insert temporal references into a plurality of records written within a table of a shared database, the temporal references indicative of an order in which the records are written;
point a table write cursor at a last-written record from among the plurality of records;
maintain one or more read cursors for the table, each read cursor pointing to a last-read record of a corresponding application from among the plurality of records; and
provide, table updates to a particular application as a state-collapsed model by determining a chain of one or more updated records of the table from the last-read record of the particular application to the last-written record, the chain of one or more updated records determined by walking a particular read cursor for the particular application through the temporal references of the one or more updated records until the particular read cursor points to the last-written record according to the table write cursor, wherein in a state-collapsed model the updates are collapsed into a same physical copy of a given record.

13. The computer-readable media as in claim 12, wherein pointing the table write cursor at the last-written record is based on receiving an update to a field of the last-written record.

14. The computer-readable media as in claim 12, wherein pointing the table write cursor at the last-written record is based on receiving an explicit instruction from a given application that updated the last-written record.

15. The computer-readable media as in claim 12, wherein the software, when executed, is further operable to:
delete a given record of the plurality of records only once all applications associated with the one or more read cursors been informed that the given record has been marked for deletion.

16. The computer-readable media as in claim 12, wherein the software, when executed, is further operable to:
replicate the shared database to a secondary database, wherein one of the one or more read cursors of the table is used for replicating the shared database to the secondary database.

17. The computer-readable media as in claim 12, wherein the software, when executed, is further operable to:
notify the particular application of an update to the table, wherein the providing table updates is based on the notifying.

18. The computer-readable media as in claim 12, wherein the software, when executed, is further operable to:
determine a change to a particular value within a given record of the plurality of records;
determine whether the change to the particular value surpasses a notification filter; and
based on the change surpassing the notification filter, export a change notification for the given record to one or more applications at a next export interval.

* * * * *

UNITED STATES PATENT AND TRADEMARK OFFICE
CERTIFICATE OF CORRECTION

| | |
|---|---|
| PATENT NO. | : 10,599,672 B2 |
| APPLICATION NO. | : 15/288140 |
| DATED | : March 24, 2020 |
| INVENTOR(S) | : Jeffrey Y. D. Lo et al. |

It is certified that error appears in the above-identified patent and that said Letters Patent is hereby corrected as shown below:

In the Specification

Column 6, Line 10, please amend as shown:
for each field that is updated by the writer;

Signed and Sealed this
Thirtieth Day of June, 2020

Andrei Iancu
*Director of the United States Patent and Trademark Office*